United States Patent
Sharifi et al.

(10) Patent No.: US 11,924,150 B2
(45) Date of Patent: Mar. 5, 2024

(54) SYSTEM(S) AND METHOD(S) FOR ENABLING A REPRESENTATIVE ASSOCIATED WITH AN ENTITY TO MODIFY A TRAINED VOICE BOT ASSOCIATED WITH THE ENTITY

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 113 days.

(21) Appl. No.: 17/551,863

(22) Filed: Dec. 15, 2021

(65) Prior Publication Data

US 2023/0188481 A1   Jun. 15, 2023

Related U.S. Application Data

(60) Provisional application No. 63/289,597, filed on Dec. 14, 2021.

(51) Int. Cl.
    *H04L 51/02*     (2022.01)
    *G06V 40/16*     (2022.01)
            (Continued)

(52) U.S. Cl.
    CPC ............ *H04L 51/02* (2013.01); *G06V 40/172* (2022.01); *G10L 15/08* (2013.01); *G10L 17/06* (2013.01); *G10L 2015/088* (2013.01)

(58) Field of Classification Search
    CPC ........... H04L 51/02; G06F 3/167; G06F 21/32
    See application file for complete search history.

(56) References Cited

U.S. PATENT DOCUMENTS

| 10,453,456 B2 | 10/2019 | Nicholls et al. |
| 11,087,769 B1 | 8/2021 | Narayanan |

(Continued)

FOREIGN PATENT DOCUMENTS

| EP | 3920181 | 3/2021 |
| EP | 3920181 A2 | 3/2021 |

OTHER PUBLICATIONS

European Patent Office; Invitation to Pay Additional Fees; 12 pages; dated Sep. 2, 2022.

(Continued)

*Primary Examiner* — Tom Y Chang
(74) *Attorney, Agent, or Firm* — Gray Ice Higdon

(57) ABSTRACT

Implementations are directed to enabling a representative associated with an entity to quickly and efficiently modify a voice bot associated with the entity. The voice bot can be previously trained to communicate with user(s) on behalf of the entity through various communication channels (e.g., a telephone communication channel, a software application communication channel, a messaging communication channel, etc.). Processor(s) of a computing device can receive, from the representative, representative input to modify behavior(s) and/or parameter(s) that the voice bot utilizes in communicating with the plurality of users via the communication channels, determine whether the representative is authorized to cause the behavior(s) and/or parameter(s) to be modified, and cause the behavior(s) and/or parameter(s) to be modified in response to determining that the representative is authorized. Notably, the representative input can be received through the same communication channels that the user(s) utilize to communicate with the voice bot.

15 Claims, 9 Drawing Sheets

(51) Int. Cl.
  *G10L 15/08*  (2006.01)
  *G10L 17/06*  (2013.01)

(56) References Cited

U.S. PATENT DOCUMENTS

| | | | |
|---|---|---|---|
| 2011/0317685 A1* | 12/2011 | Torgersrud | H04M 3/2281 |
| | | | 370/352 |
| 2015/0169336 A1* | 6/2015 | Harper | G06Q 30/0277 |
| | | | 715/706 |
| 2017/0199998 A1 | 7/2017 | Bruno et al. | |
| 2017/0289168 A1* | 10/2017 | Bar | H04L 63/1408 |
| 2019/0156222 A1* | 5/2019 | Emma | G06N 5/041 |
| 2020/0110864 A1 | 4/2020 | Casado et al. | |
| 2020/0137230 A1* | 4/2020 | Spohrer | H04M 7/0027 |
| 2020/0145615 A1* | 5/2020 | Seko | G06N 20/00 |
| 2020/0366671 A1* | 11/2020 | Larson | H04W 12/06 |
| 2021/0090570 A1 | 3/2021 | Aharoni et al. | |
| 2022/0075947 A1* | 3/2022 | Swvigaradoss | G06F 40/289 |

OTHER PUBLICATIONS

European Patent Office; International Search Report and Written Opinion issued in Application No. PCT/US2021/063549; 19 pages; dated Oct. 26, 2022.

\* cited by examiner

SYSTEM(S) AND METHOD(S) FOR ENABLING A REPRESENTATIVE ASSOCIATED WITH AN ENTITY TO MODIFY A TRAINED VOICE BOT ASSOCIATED WITH THE ENTITY

BACKGROUND

Trained voice bots can be interacted with by humans (referred to as users) via a variety of computing devices, such as smart phones, tablet computers, wearable devices, automobile systems, standalone personal assistant devices, and so forth. The trained voice bots receive input from the user (e.g., spoken, touch, and/or typed) and respond with responsive output (e.g., visual and/or audible). The users can interact with the trained voice bots to cause the trained voice bots to perform action(s) on behalf of the users. As one example, a given user (or automated assistants on behalf of the given user) can initiate a telephone call with an entity, and a given trained voice bot associated with the restaurant can answer the telephone call on behalf of a representative associated with the entity. Further, the given trained voice bot can engage in a dialog with the given user, and can perform the action(s) on behalf of the given user. For instance, the given voice bot can engage in a dialog with the user to make a restaurant reservation for the given user, answer questions asked by the given user (e.g., hours of operation, special menu items, types of dining, etc.), etc. Further, the given voice bot can make the restaurant reservation, answer the questions, etc. based on the dialog.

These trained voice bots are generally trained based on a plurality of rules that define how the trained voice bots should conduct the dialog (e.g., rules-based voice bots) and/or based on a plurality of examples that illustrate how the trained voice bots should conduct the dialog (e.g., example-based voice bots). However, to modify behaviors of these trained voice bots and/or parameters utilized by these trained voice bots, developers are generally required to modify the rules and/or the examples utilized to train the voice bots. Put another way, some level of expertise may be required to modify the behaviors of these trained voice bots and/or the parameters utilized by these trained voice bots regardless of how significant or insignificant the modification may be, such that the representatives associated with the entity are generally not able to make the modifications without help from the developers. As a result, computational resources of various computing devices and network resources are wasted as the representatives contact the developers to convey the desired modifications to the developers and as the developers retrain the voice bots to include the desired modifications.

SUMMARY

Implementations described herein are directed to enabling a representative associated with an entity to quickly and efficiently modify a voice bot associated with the entity. The voice bot can be previously trained to communicate with user(s) on behalf of the entity through various communication channels (e.g., a telephone communication channel, a software application communication channel, a messaging communication channel, etc.). Processor(s) of a computing device can receive, from the representative, representative input to modify behavior(s) and/or parameter(s) that the voice bot utilizes in communicating with the plurality of users via the communication channels, determine whether the representative is authorized to cause the behavior(s) and/or parameter(s) to be modified, and cause the behavior(s) and/or parameter(s) to be modified in response to determining that the representative is authorized. Notably, the representative input can be received through the same communication channels that the user(s) utilize to communicate with the voice bot. Put another way, implementations described herein enable the voice bot associated with the entity to be quickly and efficiently modified based on natural language input of the representative associated with the entity. As a result, the representative need not have extensive knowledge with how the voice bot is trained or updated, how to utilize a platform for training the voice bot, etc. to cause the modifications to be implemented.

For example, assume a voice bot associated with Hypothetical Café—a fictitious restaurant—was previously trained to communicate with a plurality of users by answering incoming telephone calls directed to Hypothetical Café, by engaging in a dialog with users via a restaurant reservation software application, and/or utilize any other available communication channel to communicate with the plurality of users. Further assume that the operating hours of Hypothetical Café have recently changed. In this example, an owner or employee of Hypothetical Café can direct a phone call to a phone number associated with Hypothetical Café to communicate with the voice bot, access a restaurant reservation software application to communicate with the voice bot, and/or utilize any other available communication channels to communicate with the voice bot. Further assume that, in communicating with the voice bot, the owner or employee of Hypothetical Café provides representative input to modify the operating hours of Hypothetical Café. In this example, the voice bot can process the representative input to determine that the representative input was provided by the owner or employee and can cause parameter(s) for the operating hours to be modified to reflect updated operating hours. Accordingly, when a given user subsequently communicates with the voice bot associated with Hypothetical Café and requests the operating hours, responsive content provided by the voice bot associated with Hypothetical Café in response to the request is accurate and up-to-date.

In some implementations, the parameter(s) to be modified based on the representative input can be based on a type of the entity associated with the voice bot. Although the above example is described with respect to the parameter(s) for the operating hours being modified, it should be understood that is for the sake of example. For instance, other parameter(s) utilized by voice bots associated with restaurants may include seating type parameters (e.g., whether outdoor seating is available, etc.), restaurant reservation parameters (e.g., whether reservations are being accepted, how many reservations are being accepted, times of available reservations, etc.), menu parameters (e.g., whether special menu items are available, what those special menu items are, etc.), and/or any other parameters that the voice bot may utilize in communicating with the plurality of users. In contrast, and assuming the voice bot is previously trained for Example Hair Salon—a fictitious hair salon—the parameter(s) to be modified based on the representative input can include, for example, hairdresser parameters (e.g., what days certain hairdressers work), hairdresser appointment parameters (e.g., whether appointments are being accepted, how many appointments are being accepted, times of available appointments, etc.). Accordingly, it should be understood that the parameter(s) to be modified based on the representative input are virtually limitless across all voice bots, but vary from voice bot to voice bot depending on the entity for which the voice bot is previously trained.

In some implementations, the behavior(s) to be modified based on the representative input can be include, for example, one or more prosodic properties utilized by the voice bot in generating synthesized speech (e.g., rhythm, pitch, tone, intonation, etc.), and/or a vocabulary utilized by the voice bot in generating content (and optionally leveraging one or more language models (LM(s))). Continuing with the above example, further assume that Hypothetical Café is an Italian restaurant. In this example, the owner or employee can provide representative input that causes the voice bot to adopt an Italian chef personality in that the voice bot will subsequently utilize a vocabulary of an Italian chef (and optionally leveraging LM(s)) and prosodic properties in synthesizing speech that reflect those of an Italian chef. Accordingly, the behavior(s) to be modified based on the representative input are also virtually limitless across all voice bots.

In some implementations, the voice bot can cause the authorization to be performed in response to determining that the representative input is being provided to modify the behavior(s) and/or parameter(s) of the voice bot. In some versions of those implementations, the voice bot can utilize audio-based authorization techniques to perform the authorization based on processing audio data that captures spoken input of the representative and that is generated by microphone(s) of a computing device of the representative. The audio-based authorization techniques can include, for example, text dependent (TD) speaker identification (SID), text independent (TI) SID, word detection (e.g., monitor for an occurrence of a particular word or phrase, such as a password or personal identification number), and/or any other audio-based authorization. In some further versions of those implementations, and assuming the representative input corresponds to spoken input, the audio-based authorization techniques can be performed on the representative that is initially provided to modify the behavior(s) and/or the parameter(s). In additional or alternative further versions of those implementations, the voice bot can prompt the representative to provide additional representative input that corresponds to spoken input to perform the audio-based authorization. These audio-based authorization techniques are described in more detail herein.

In additional or alternative versions of those implementations, the voice bot can utilize non-audio-based authorization techniques to perform the authorization based on processing non-audio data generated by non-microphone sensor(s) of the computing device of the representative. The non-audio-based authorization techniques can include, for example, face identification based on processing vision data generated by vision component(s) of the computing device of the representative, fingerprint identification based on processing fingerprint data generated by fingerprint sensor(s) of the computing device of the representative, face identification based on processing vision data generated by vision component(s) of the computing device of the representative, password or personal identification number verification based on processing typed data and/or touch data generated by a touch-sensitive display of the computing device of the representative, location authentication based on processing location data generated by location sensor(s) of the client device of the representative that indicate whether the representative is physically located at an authorized location (e.g. a physical address associated with the entity), device authentication based on processing a device identifier of the computing device of the representative that indicates the computing device is authorized, user account authorization based on processing user account data of a user account of the representative of the computing device, and/or any other non-audio-based authentication.

In additional or alternative versions of those implementations, different representatives associated with the entity may have different levels of authorization. As a result, one or more representatives associated with the entity can cause all modifications to be made to the voice bot, whereas other representatives can only cause a subset of those modifications to be made to the voice bot. Continuing with the above example, the representative input may be provided by a hostess of Hypothetical Café that is authorized to modify all parameters used by the voice bot, but may not be authorized to modify any behaviors of the voice bot. However, the owner of Hypothetical Café may be authorized to modify all parameters and behaviors of the voice bot.

In some implementations, and subsequent to modifying the behavior(s) and/or the parameter(s) of the voice bot, the voice bot can further cause one or more external databases to be updated. For example, the voice bot can generate a structured request that includes an indication of the updated behavior(s) and/or the parameter(s) of the voice bot, and can cause the structured request to be transmitted to one or more of the external databases. The one or more external databases can include databases that are utilized by software applications, such as knowledge graphs, remote memory, and/or any other database. Accordingly, when users subsequently access these external databases or utilize software applications that access these external databases, the information included in these databases is up-to-date. Continuing with the above example, if a user subsequently views Hypothetical Café in a navigation application that includes a snippet of information about Hypothetical Café, then the operating hours included in that snippet accurately reflect those provided by the representative and without the representative having to perform any action directed to the navigation application.

By using the techniques described herein, one or more technical advantages can be achieved. As one non-limiting example, techniques described herein enable a representative associated with an entity to quickly and efficiently modify a voice bot associated with the entity through natural language input. Accordingly, the representative need not have extensive knowledge with how the voice bot is trained or updated, how to utilize a platform for training the voice bot, etc. to cause the modifications to be implemented. Further, the representative need not generate and transmit requests to a developer that has such knowledge. As a result, computational resources can be conserved at computing device(s) by obviating the need to generate the requests and network resources can be conserved by obviating the need to transmit the requests. As one non-limiting example, techniques described herein enable external database(s) to be updated based on the modifications to the voice bot. Accordingly, when users subsequently access these external database(s), information is accurate and up-to-date, thereby reducing a quantity of user input received at computing devices of the users in searching for accurate and up-to-date information. As a result, computational resources can be conserved at the computing devices of the users.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

DETAILED DESCRIPTION

Figure 1:
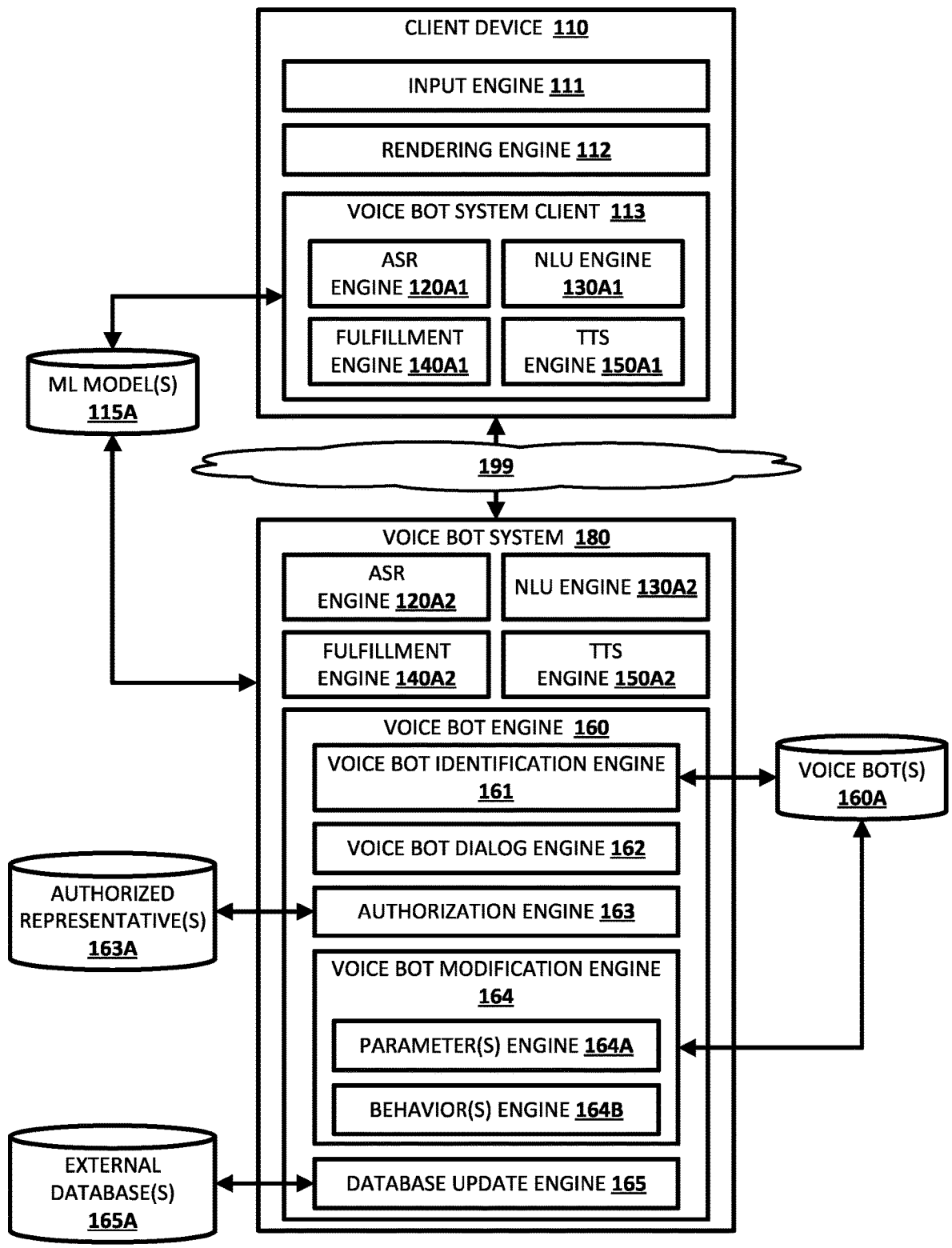
FIG. 1 depicts a block diagram of an example environment that demonstrates various aspects of the present disclosure, and in which implementations disclosed herein may be implemented.

Turning now to FIG. 1, a block diagram of an example environment that demonstrates various aspects of the present disclosure is depicted. A client device 110 is illustrated in FIG. 1, and includes, in various implementations, input engine 111, rendering engine 112, and voice bot system client 113. The voice bot system client 113 includes, in various implementations, automatic speech recognition (ASR) engine 120A1, natural language understanding (NLU) engine 130A1, fulfillment engine 140A1, and text-to-speech (US) engine 150A1. The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus that includes a computing device (e.g., a watch having a computing device, glasses having a computing device, a virtual or augmented reality computing device). Additional and/or alternative client devices may be provided.

In various implementations, the input engine 111 can detect representative input at the client device 110 provided by a representative associated with an entity as described herein. The representative input detected at the client device 110 can include spoken input detected via microphone(s) of the client device 110, touch input detected via a user interface input device (e.g., a touch sensitive display, a mouse, etc.) of the client device 110, and/or typed input detected via a user interface input device (e.g., a touch sensitive display, a keyboard, etc.) of the client device 110. The representative input can be processed using various components of the client device 110 described herein to determine whether the representative is directed to a software application accessible at the client device 110, an automated assistant executing at least in part at the client device 110, a voice bot accessible at the client device 110 via a voice bot system client 113, and/or other operations that may be performed at the client device 110.

In various implementations, the rendering engine 112 can render content for presentation to the representative associated with the entity (e.g., responsive content, prompt(s), and/or other content). The content can be responsive to detecting representative input via the input engine 111. The rendering engine 112 can render the content for audible presentation to the representative (e.g., via speaker(s) of the client device 110) and/or for visual presentation to the representative (e.g., via a display of the client device 110). Moreover, the rendering engine 112 can cause a transcript of any dialog to be rendered on a display of the client device 110 (e.g., in implementations where the client device 110 includes a display). In some implementations, the transcript can correspond to a dialog between a representative of the client device 110 and the voice bot (e.g., as described with respect to FIGS. 5C and 5D).

In various implementations, the voice bot system client 113 can interact with a voice bot system 180. In some versions of those implementations, the voice bot system client 113 can execute the voice bot system 180 locally at the client device 110. In additional or alternative versions of those implementations, the voice bot system 180 can be executed remotely from the client device 110 as depicted in FIG. 1 and interact with the voice bot system client 113 over one or more networks 199 as depicted in FIG. 1 (e.g., Wi-Fi, Bluetooth, near-field communication, local area network(s), wide area network(s), a public switched telephone network (PSTN) and/or other networks). The voice bot system client 113 and the voice bot system 180 may be collectively referred to herein simply as voice bot. Similar to the voice bot system client 113, the voice bot system 180 includes an ASR engine 120A2, an NLU engine 130A2, a fulfillment engine 140A2, and a TTS engine 140A2. These engines can be cloud-based counterparts of those described with respect to the voice bot system client 113 in implementations where the voice bot system 180 is implemented remotely from the voice bot system client 113.

As described herein, the client device 110 can detect representative input provided by a representative associated with an entity to modify behavior(s) and/or parameter(s) utilized by a voice bot that is also associated with the entity (e.g., a person, a business, a location, etc.). The voice bot can be one of a plurality of voice bots stored in voice bot(s) database 160A. Further, the voice bot can be any previously trained voice bot that is trained to interact with a plurality of users on behalf of the entity via one or more communication channels, including, but not limited to a telephone communication channel, a software application communication channel, a browser-based communication channel, and a messaging communication channel. Moreover, the voice bot can correspond to, for example, one or more transformer machine learning (ML) models, one or more recurrent neural network (RNN) ML models, one or more long short-term memory (LSTM) ML models, and/or other ML models. The voice bot can be trained based on processing a plurality of training instances. In some implementations, the voice bot is a rules-based voice bot, whereas in additional or alternative implementations, the voice bot is an example-based voice bot. In these implementations, the voice bot is trained based on the plurality of training instances to learn how the voice bot should communicate with the plurality of users via one or more of the communication channels. Notably, the representative input described herein can be received through the same communication channels that the plurality of users utilize to communicate with the voice bot (e.g., as described with respect to FIGS. 5A-5D).

When the representative input is detected at the client device 110 via the input engine 111, the various engines of the voice bot system client 113 and/or the voice bot system 180 can be utilized to perform various functions. For example, and assuming the representative input described herein is spoken input provided by the representative associated with the entity, the ASR engine 120A1 and/or 120A2 can process, using ASR model(s) stored in machine learning (ML) model(s) database 115A (e.g., an RNN ML model, a transformer model, and/or any other type of ML model capable of performing ASR), audio data that captures the spoken input and that is generated by microphone(s) of the client device 110 to generate ASR output. Further, the NLU engine 130A1 and/or 130A2 can process, using NLU model(s) stored in the ML model(s) database 115A (e.g., a LSTM ML model, a gated recurrent unit (GRU) ML model, and/or any other type of RNN or other ML model capable of performing NLU) and/or grammar-based rule(s), the ASR output to generate NLU output. Moreover, the fulfillment engine 140A1 and/or 140A2 can generate fulfillment output(s) based on fulfillment data generated based on the NLU output. The fulfillment data can be generated using, for example, one or more parameters that the voice bot utilizes in communicating with the plurality of users, one or more external databases that the voice bot accesses to obtain content utilized in communicating with the plurality of users, and/or other fulfillment data that is obtained responsive to the representative input. Lastly, the TTS engine 150A1 and/or 150A2 can process, using TTS model(s) stored in the ML model(s) database 115A, textual data (e.g., text formulated by the voice bot) to generate synthesized speech audio data that includes computer-generated synthesized speech. Notably, the ML model(s) stored in the ML model(s) database 115A can be on-device ML models that are stored locally at the client device 110 or shared ML models that are accessible to both the voice bot system client 113 and/or the voice bot system 180.

In various implementations, the ASR model(s) are end-to-end speech recognition model(s), such that the ASR engine(s) 120A1 and/or 120A2 can generate recognized text corresponding to spoken input directly using the model. For instance, the ASR model(s) can be end-to-end model(s) used to generate the recognized text on a character-by-character basis (or another token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency Cepstral coefficients (MFCCs) or other representation) to generate the recognized text, an RNN-T model can be used to continuously process input samples and stream output symbols (e.g., characters of the alphabet). Also, for example, when the ASR model(s) are not an end-to-end speech recognition model(s), the ASR engine(s) 120A1 and/or 120A2 can instead generate predicted phoneme(s) (and/or other representations). For instance, with such models the predicted phoneme(s) (and/or other representations) are then utilized by the ASR engine(s) 120A1 and/or 120A2 to determine the recognized text that conforms to the predicted phoneme(s). In doing so, the ASR engine(s) 120A1 and/or 120A2 can optionally employ a decoding graph, a lexicon, and/or other resource(s).

In various implementations, the NLU output can include, for example, annotated recognized text that includes one or more annotations of the recognized text for one or more (e.g., all) of the terms of the recognized text (or text corresponding to textual input or typed input when the representative input is not spoken input). For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device being associated with a single representative, it should be understood that is for the sake of example and is not meant to be limiting. For example, one or more additional client devices of a representative can also implement the techniques described herein. For instance, the client device 110, one or more additional client devices, and/or any other computing devices of the representative can form an ecosystem of devices that can employ techniques described herein. These additional client devices and/or computing devices may be in communication with the client device 110 (e.g., over one or more of the networks 199). As another example, a given client device can be utilized by multiple representatives in a shared setting (e.g., a group of representatives, co-workers, etc.).

As described herein, a voice bot engine 160 of voice bot system 180 can utilize the ASR output generated by the ASR engine 120A1 and/or 120A1 and/or the NLU output generated by the NLU engine 130A1 and/or 130A2 generated based on the representative input to communicate with the representative that provided the representative input via one or more of the communication channels. The voice bot engine includes a voice bot identification engine 161, a voice bot dialog engine 162, an authorization engine 163, a voice bot modification engine 164, and a database update engine 165. The voice bot modification engine 164 includes a parameter(s) engine 164A and a behavior(s) engine 164B. In particular, techniques described herein are directed to enabling the representative to quickly and efficiently modify one or more parameters and/or one or more behaviors of the voice bot by providing the representative input via one or more of the communication channels. Notably, the representative input can be provided through the same communication channels that the plurality of users utilize to communicate with the voice bot.

In various implementations, the voice bot identification engine 161 can identify a voice bot from among a plurality of voice bots stored in the voice bot(s) database 160. In some implementations, the voice bot identification engine 161 can identify the voice bot by accessing an index associated with the voice bot(s) database 160 that includes a mapping between voice bots and entities for any voice bot that is stored in the voice bot(s) database 160A. In additional or alternative implementations, the voice bot identification engine 161 can identify the bot by identifying one or more terms of the representative input (based on the representative input itself, or based on ASR output and/or NLU output generated based on the representative input) that identify the entity and/or the voice bot associated with the entity.

For the sake of example in FIG. 1, assume that the entity corresponds to Example Hair Salon (a fictitious a hair salon), that the representative associated with the entity corresponds to a hairdresser at Example Hair Salon, and that the voice bot is a hair salon voice bot previously trained to communicate with customers of Example Hair Salon over the phone, through a software application that enables the customers of the hair salon to make inquiries and/or appointments at Example Hair Salon, and/or interact with the customers of Example Hair Salon through other communication channels and on behalf of the hair salon. In this example, the voice bot identification engine 161 can identify the voice bot associated with Example Hair Salon based on the voice bot being stored in association with an identifier of Example Hair Salon in the voice bot(s) database 160A. Additionally, or alternatively, further assume that the hairdresser provides spoken input of "Call Example Hair Salon" as the representative input. In this example, the voice bot identification engine 161 can identify the voice bot associated with Example Hair Salon based on based on the terms "Example Hair Salon" being included in the representative input (e.g., determined using the ASR engine 120A1 and/or 120A2).

In various implementations, the voice bot dialog engine 162 can cause the voice bot to engage in a dialog with the representative that provided the representative input (and/or the plurality of users). For example, in implementations when the representative input is spoken input (e.g., via a telephone communication channel, a software application communication channel, etc.), the voice bot dialog engine 162 can obtain content that is determined to be responsive to the spoken input (e.g., based on processing the spoken input using the ASR engine 120A1 and/or 120A2, the NLU engine 130A1 and/or 130A2, and/or the fulfillment engine 140A1 and/or 140A2). Further, the voice bot dialog engine 162 can generate instances of synthesized speech audio data that includes synthesized speech corresponding to content that is responsive to the representative input to be provided for presentation to the representative (e.g., using the TTS engine 150A1 and/or 150A2). Moreover, the voice bot dialog engine 162 can cause the synthesized speech audio data to be provided for audible presentation to the representative via speaker(s) of the client device 110 and optionally over one or more of the networks 199. Additionally, or alternatively, the voice bot dialog engine 162 can cause the textual data that includes the content to be provided for visual presentation to the representative via a display of the client device 110 and optionally over one or more of the networks 199

Continuing with the above example, further assume that the representative initiates a phone call with a telephone number associated with Example Hair Salon, and that the voice bot associated with Example Hair Salon answers the telephone call on behalf of Example Hair Salon to engage in a dialog with the representative. Further assume that the representative provides spoken input of "What is Jane's availability for appointments today?", where the representative Jane is a hairdresser at Example Hair Salon and calling to check her availability for the day. In this example, the voice bot dialog engine 162 can cause the ASR engine 120A1 and/or 120A2 to process the spoken input to generate recognized text that is predicted to correspond to the spoken input. Further, the voice bot dialog engine 162 cause the NLU engine 130A1 and/or 130A2 to process the recognized text to generate annotated recognized text that indicates the spoken input includes an intent to lookup availability for a hairdresser at Example Hair Salon with a slot value of "Jane" for a hairdresser parameter and a slot value of "today" for a date parameter. Moreover, the voice bot dialog engine 162 can cause the fulfillment engine 140A1 and/or 140A2 to generate a structured request based on the annotated recognized text and execute a search over one or more databases based on the structured request, such as a search over a calendar or appointments software application or database. Accordingly, in this example, the voice bot dialog engine 162 can cause content that includes the availability of Jane to be provided for audible and/or visual presentation to Jane in response to the spoken input being received at the client device 110, such as "Jane has appointments available today at 11:30 AM and 12:00 PM".

In various implementations, the authorization engine 163 can determine whether the representative that provided the representative input is authorized to modify one or more behaviors and/or one or more parameters that the voice bot utilizes in communicating with the plurality of users. The authorization engine 163 can make this determination in response to determining that the representative input includes a request to modify one or more of the behaviors and/or one or more of the parameters. The one or more behaviors can include, for example, a personality associated with the voice bot that is one of a plurality of disparate personalities and that utilizes a unique vocabulary in generating the content (and optionally utilizing one or more language models (LMs)), one or more prosodic properties associated with the voice bot that influence how the voice bot generates the synthesized speech audio data (e.g., different intonations, rhythms, pitches, tones, etc.), and/or other behaviors of the voice bot. Further, the one or more parameters can include, for example, one or more slot values that are utilized by the voice bot and may depend on a type of the entity associated with the voice bot. In the above example where the entity is Example Hair Salon, the slot values may include hairdresser's names, available appointment times, hours of operation, and/or other slot values. In contrast, assume that the voice bot is associated with Hypothetical Café—a fictitious restaurant. In this example, the slot values may also include hours of operation, but may alternatively include menu items, types of seating available, available reservation times, types of dining available, and/or other slot values.

Continuing with the above example, further assume that the representative provides additional spoken input of "Remove both appointments". In this example, the voice bot dialog engine 162 can cause the ASR engine 120A1 and/or 120A2 to process the additional spoken input to generate additional recognized text that is predicted to correspond to the additional spoken input, and can cause the NLU engine 130A1 and/or 130A2 to process the additional recognized text to generate additional annotated recognized text that indicates the additional spoken input includes an intent to remove the two remaining available appointments. In this example, the voice bot dialog engine 162 may determine that the representative is attempting to modify available appointment times for a particular hairdresser. Accordingly, the voice bot dialog engine 162 can cause the authorization engine 163 to determine whether the representative is authorized to remove the available appointments.

In some implementations, the authorization engine 163 may perform audio-based authorization to determine whether the representative is authorized to modify one or more of the behaviors and/or one or more of the parameters. The audio-based authorization can include, for example, processing audio data generated by microphone(s) of the client device 110 that captures the representative input (or additional representative input) to perform speaker identification (SID) (e.g., text dependent (TD) SID and/or text independent (TI) SID), perform word detection (e.g., monitoring for an occurrence of a particular word or phrase, such as a password or personal identification number), and/or other audio-based authorization techniques. In additional or alternative implementations, the authorization engine 163 may perform non-audio authorization to determine whether the representative is authorized to modify one or more of the behaviors and/or one or more of the parameters. The non-audio-based authorization can include, for example, processing textual data and/or touch data generated by a user interface input device of the client device 110 to perform word detection (e.g., monitoring for an occurrence of a particular word or phrase, such as a password or personal identification number), processing vision data generated by vision component(s) of the client device 110 to perform facial identification, processing fingerprint data generated by fingerprint component(s) of the client device 110 to perform fingerprint identification, process location data generated by location sensor(s) of the client device 110 to perform location identification, processing a device identifier of the client device 110 that the representative is utilizing to communicate with the voice bot to perform device authentication, and/or other non-audio-based authorization techniques. In these implementations, the authorization engine 163 can determine a type of the authorization to be performed (e.g., audio-based, non-audio-based, and/or a subset thereof) based on an intent or group of intents associated with representative input that triggered the authorization as described with respect to FIG. 4.

In some versions of those implementations, in performing audio-based authorization, the authorization engine 163 can process, using speaker SID model(s) stored in the ML model(s) database 115A, the audio data that captures the representative input to generate a speaker embedding. The representative input can be the same representative input that includes the request to modify one or more of the parameters and/or one or more of the behaviors, or the representative input can be additional representative input that the representative is prompted to provide in response to determining that the representative input that includes the request to modify one or more of the parameters and/or one or more of the behaviors. The generated speaker embedding can be compared, in embedding space, with one or more previously generated speaker embeddings for the user of the client device 110 (e.g., an embedding stored in the authorized representative(s) database 163A). For example, if a distance metric, determined based on the comparing in the embedding space, between the generated speaker embedding and the one or more previously generated speaker embeddings satisfies a threshold, the representative can be authorized. The one or more previously generated speaker embeddings for the user can be generated based on output(s) generated based on processing of one or more instances of audio data that includes spoken inputs that are from the representative (e.g., when initially configuring the client device 110 and/or the voice bot). For example, the one or more previously generated speaker embeddings can be based on an average (or other combination) of a plurality of different embeddings that are each generated based on processing of a corresponding instance of audio data that includes a corresponding spoken input of the representative. In some versions of those implementations, the SID model can be a TI SID model, whereas in additional or alternative implementations, the SID model can be a TD SID model.

In TD SID, the one or more previously generated speaker embeddings are generated based on spoken inputs that include only one or more particular words or phrases. Moreover, in use, the representative must speak the one or more particular words or phrases for one or more TD SID speaker embedding to be generated using the TD SID model, which can be effectively compared to one or more previously generated TD speaker embedding to determine whether the spoken input is from an authorized representative (e.g., Jane the hairdresser or an owner of Example Hair Salon). For example, the one or more particular words or phrases in TD speaker recognition can be constrained to one or more particular word or phrases (e.g., hot words and/or trigger words for an automated assistant, such as, for example, "Hey Assistant", "OK Assistant", and/or "Assistant", one or more passwords, and/or other words or phrases). In contrast, in TI SID, the spoken input processed using the TI SID model is not constrained to the one or more particular words or phrases. In other words, audio data based on virtually any spoken inputs can be processed using the TI SID model to generate a TI SID speaker embedding, which can be effectively compared to one or more previously generated TI speaker embeddings to determine whether the spoken utterance is from an authorized representative (e.g., Jane the hairdresser or an owner of Example Hair Salon). Moreover, in various implementations, the one or more previously generated TI speaker embeddings of the user utilized in TI SID are generated based on spoken inputs that include disparate words and/or phrases and are not limited to particular words or phrases.

In some versions of those implementations, in performing audio-based authorization, the authorization engine 163 can process, using word detection model(s) stored in the ML model(s) database 115A, the audio data that captures the representative input to predict whether the representative input includes a particular word or phrase. The processing by the word detection model may be the same or similar to that described above with respect to the processing in the TD SID model, but the word detection model may monitor for an occurrence of a particular word or phrase without regard to determining whether it was provided by an authorized user.

In some versions of those implementations, in performing non-audio-based authorization, biometric information and/or textual data or typed data can be utilized to authorize the representative. The biometric information utilized to verify the identity of the user can include, for example, facial identification, fingerprint identification, and/or other types of biometric information. For example, vision component(s) of client device 110 can capture vision data that includes a face of the representative. The authorization engine 163 can process, using a face identification (FID) model stored in the ML model(s) database 115A, the vision data to generate a facial embedding of the representative. The facial embedding of the user that actuated the warm word button can correspond to an embedding that can be compared, in embedding space, to one or more previously generated embeddings (e.g., stored in the authorized representative(s) database 163A) to determine whether the representative is authorized to modify the voice bot as desired. As another example, a fingerprint sensor of the client device 110 can receive touch input of the representative, and compare the detected fingerprint with a known fingerprint of the representative (e.g., stored in the authorized representative(s) database 163A) to determine whether the user is authorized to modify the voice bot as desired. As yet another example, a display interface of the client device 110 can receive touch input of the user corresponding to a password or personal identification number that authorizes the representative. As yet another example, the representative of the client device 110 can sign into a user account associated with an automated assistant application for an automated assistant executing at least in part at the client device 110, a voice bot application for the voice bot associated with the entity, and/or another software application that indicates whether the representative is authorized, and optionally a level of authorization of the representative that indicates the behavior(s) and/or the parameter(s) that the representative can and/or cannot modify.

In various implementations, and assuming that the representative is authorized to modify one or more of the behaviors and/or one or more of the parameters of the voice bot, the voice bot modification engine 164 can determine how to modify the voice bot based on the representative input and/or based on additional representative input. For example, the parameter(s) engine 164A can be utilized to determine whether the representative input was provided to modify one or more of the parameters utilized by the voice bot, and the behavior(s) engine 164B can be utilized to determine whether the representative input was provided to modify one or more of the behaviors of the voice bot.

Continuing with the above example, further assume that the representative is authorized to remove the two remaining appointments for the day based on one or more of the techniques described above with respect to the authorization engine 163. In this example, the parameter(s) engine 164A can determine that the representative input modifies slot values associated with available appointments for Jane the hairdresser. Accordingly, the parameter(s) engine 164A can cause the voice bot to be modified such that the voice bot will no longer provide the two appointments as available for Jane the hairdresser in response to a given user calling Example Hair Salon and requesting available appointments for Jane the hairdresser. Similarly, had the representative input request that one or more of the prosodic properties correspond to a female voice instead of a male voice, then the behavior(s) engine 164B can determine that the representative input modifies one or more of the prosodic properties utilized by the voice bot associated with Example Hair Salon. Accordingly, the behavior(s) engine 164B can cause the voice bot to be modified such that the voice bot will use the female voice instead of the male voice in response to a given user calling Example Hair Salon. Additionally, or alternatively, the behavior(s) engine 164B can be utilized to add or remove functionality of the voice bot, such as adding a "hold" functionality and/or any other functionality.

In various implementations, the voice bot modification engine 164 can transmit an indication of the modifications made to the voice bot to the database update engine 165 that cause the database update engine 165 to update one or more external database(s) 165A. For example, the database update engine 165 can generate one or more structured requests and can cause the one or more structured requests to be transmitted to one or more of the external databases. The one or more external updates can be updated based on the one or more structured requests. In some implementations, the database update engine 165 can identify the one or more external databases to be updated based on an indication of the external databases being stored in association with one or more of the behaviors and/or one or more of the parameters. This enables the database update engine 165 to quickly and efficiently identify the one or more external databases to be updated based on one or more of the behaviors and/or one or more of the parameters that were modified based on the representative input. Continuing with the above example, the database update engine 165 can generate and transmit structured requests to a navigation application that includes a snippet on appointment information for Jane the hairdresser, a software application for Example Hair Salon that includes appointment information for Jane the hairdresser, a calendar application that includes appointment information for Jane the hairdresser, and/or to any other software application or database that utilizes the available appointments for Jane the hairdresser.

Although FIG. 1 is described with respect to particular examples, it should be understood those are provided for the sake of example and are not meant to be limiting. For example, although FIG. 1 is primarily described with respect to the representative input being spoken input and the communication channel being a telephone communication channel, it should be understood that is for the sake of example and is not meant to be limiting, and that additional or alternative types of representative inputs can be received via additional or alternative communication channels (e.g., as described with respect to FIGS. 5A-5C). As another example, although FIG. 1 is primarily described with respect to the voice bot associated with Example Hair Salon and as having particular functionalities, it should be understood that is also for the sake of example and is not meant to be limiting. Rather, it should be understood that the techniques described herein can be utilized to update any previously trained voice bot that is trained to communicate with a plurality of users via one or more communication channels and on behalf of any entity.

Figure 2:
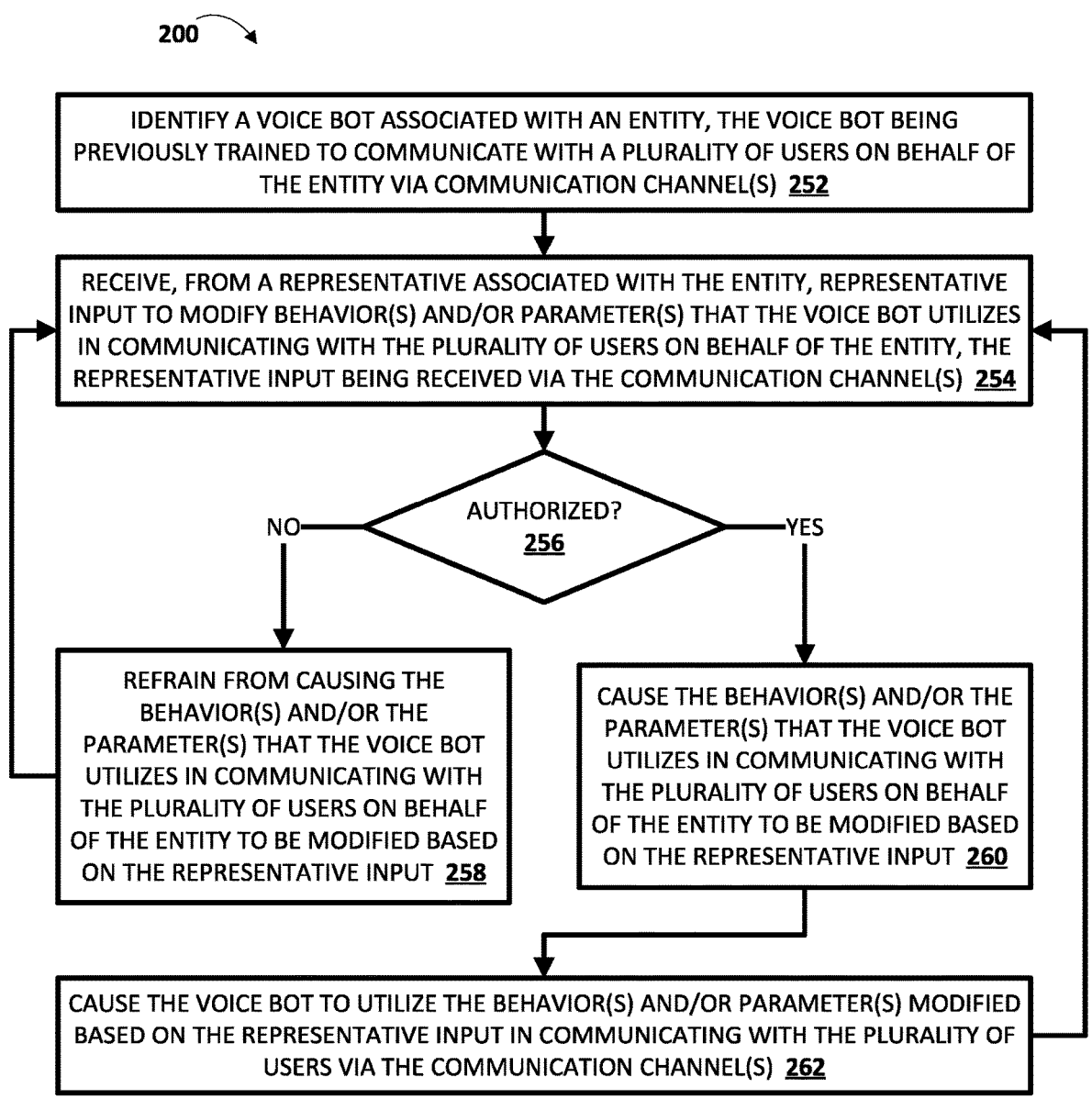
FIG. 2 depicts a flowchart illustrating an example method of modifying a voice bot based on representative input received via one or more communication channels for communicating with the voice bot, in accordance with various implementations.

Turning now to FIG. 2, a flowchart illustrating an example method 200 of modifying a voice bot based on representative input received via one or more communication channels for communicating with the voice bot is depicted. For convenience, the operations of method 200 are described with reference to a system that performs the operations. This system of method 200 includes one or more processors and/or other component(s) of a computing device (e.g., client device 110 of FIG. 1, client device 510A and/or 510B of FIGS. 5A-5D, computing device 610 of FIG. 6, one or more remote servers, and/or other computing devices). Moreover, while operations of method 200 are shown in a particular order, this is not meant to be limiting. One or more operations may be reordered, omitted, or added.

At block 252, the system identifies a voice bot associated with an entity, the voice bot being previously trained to communicate with a plurality of users on behalf of the entity via one or more communication channels. In some implementations, the system identifies the voice bot utilizing an index of a database that stores a plurality of voice bots. In additional or alternative implementations, the system identifies the voice bot based on representative input received from a representative of the client device (e.g., described with respect to block 254 of the method 200 of FIG. 2)

At block 254, the system receives, from a representative associated with the entity, representative input to modify one or more behaviors and/or one or more parameters that the voice bot utilizes in communicating with the plurality of users on behalf of the entity, the representative being received via one or more of the communication channels. The representative input can be spoken input, textual input, touch input, and/or any other type of input that the representative associated with the entity can provide to modify one or more behaviors and/or one or more parameters that the voice bot utilizes in communicating with the plurality of users on behalf of the entity. Notably, the representative input is received via the same one or more communication channels with which the plurality of users can utilize to communicate with the voice bot. Put another way, the representative can provide the representative input to modify one or more of the behaviors and/or one or more of the parameters by calling a phone number associated with the entity that other users call to engage in a dialog with the entity, by accessing a web-based interface associated with the entity that other users call to engage in a dialog with the entity (e.g., a software application, a web page, etc.), etc., and without requiring that the representative access a developer website or developer platform that was utilized to initially train the voice bot. Accordingly, the representative need not have extensive knowledge with respect to how the voice bot is trained or updated.

At block 256, the system determines whether the representative is authorized to modify one or more of the behaviors and/or one or more of the parameters that the voice bot utilizes in communicating with the plurality of users on behalf of the entity. The system can determine whether the representative is authorized to modify one or more of the behaviors and/or one or more of the parameters that the voice bot utilizes in communicating with the plurality of users on behalf of the entity using audio-based authorization and/or non-audio-based authorization as described below with respect to FIG. 4.

If, at an iteration of block 256, the system determines that the representative is not authorized, then the system proceeds to block 258. At block 258, the system refrains from causing one or more of the behaviors and/or one or more of the parameters that the voice bot utilizes in communicating with the plurality of users on behalf of the entity to be modified based on the representative input. The system returns to block 254 of the method 200 of FIG. 2 to perform an additional iteration of the method 200 of FIG. 2 in response to receiving further additional representative input from the representative. For example, if the system determines that the representative is not authorized to cause the modification, then the voice bot will cause content to be presented to the representative that indicates the representative is not authorized. In this example, and assuming that the representative is authorized to modify one or more aspects of the voice bot, then the system may cause content that includes one or more modifications that the representative is authorized to cause to be provided for presentation to the representative.

If, at an iteration of block 256, the system determines that the representative is authorized, then the system proceeds to block 260. At block 260, the system causes one or more of the behaviors and/or one or more of the parameters that the voice bot utilizes in communicating with the plurality of users on behalf of the entity to be modified based on the representative input. At block 262, the system causes the voice bot to utilize one or more of the behaviors and/or one or more of the parameters modified based on the representative input in communicating with the plurality of users via one or more of the communication channels. The system returns to block 254 of the method 200 of FIG. 2 to perform an additional iteration of the method 200 of FIG. 2 in response to receiving further additional representative input from the representative. Put another way, the system provides means for the representative to quickly and efficiently modify an existing voice bot through communication channels with which the representative is familiar such that the modifications are in place the next time another user communicates with the voice bot.

Figure 3:
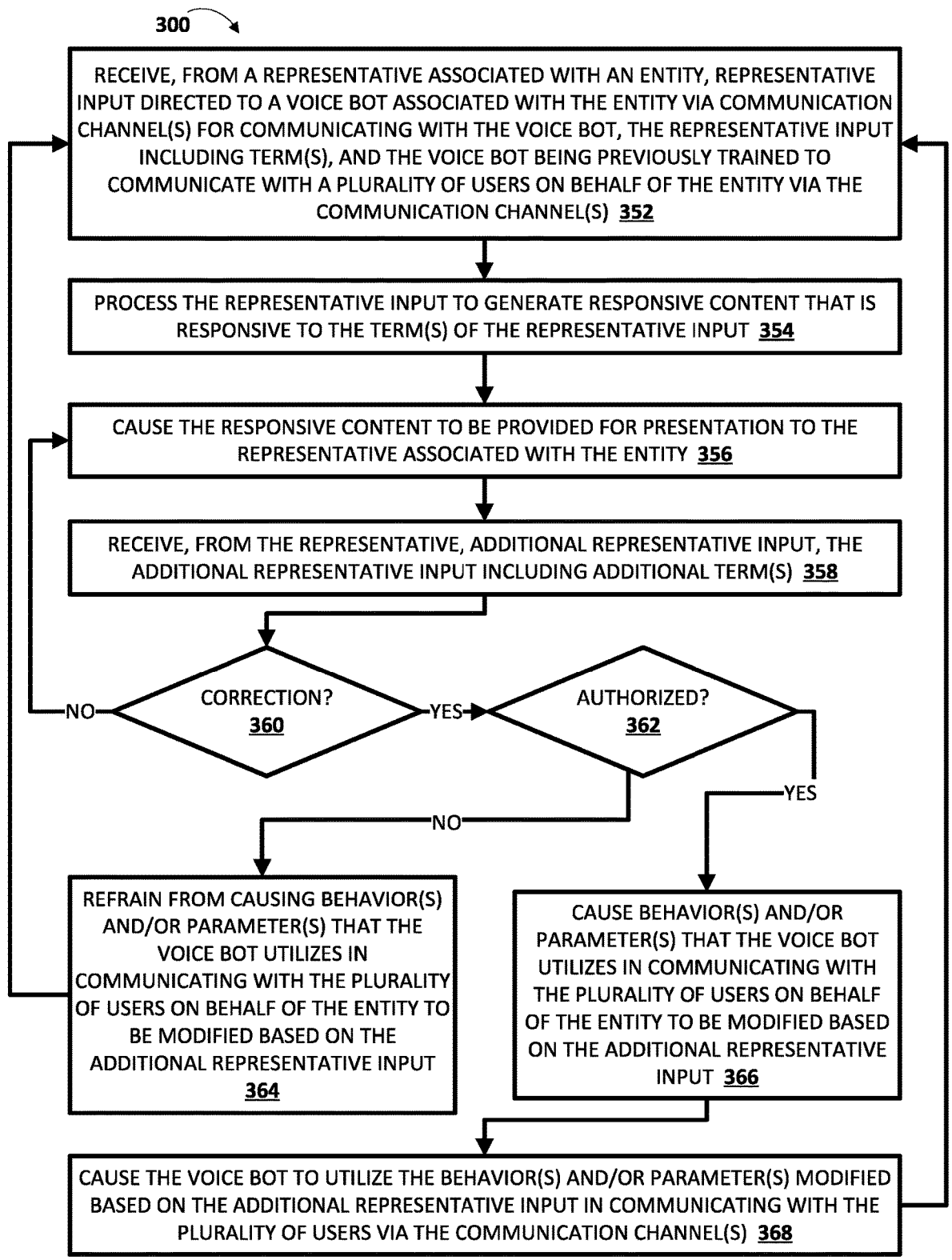
FIG. 3 depicts a flowchart illustrating another example method of modifying a voice bot based on representative input received via one or more communication channels for communicating with the voice bot, in accordance with various implementations.

Turning now to FIG. 3, a flowchart illustrating another example method 300 of modifying a voice bot based on representative input received via one or more communication channels for communicating with the voice bot is depicted. For convenience, the operations of method 300 are described with reference to a system that performs the operations. This system of method 200 includes one or more processors and/or other component(s) of a computing device (e.g., client device 110 of FIG. 1, client device 510A and/or 5106 of FIGS. 5A-5D, computing device 610 of FIG. 6, one or more remote servers, and/or other computing devices). Moreover, while operations of method 300 are shown in a particular order, this is not meant to be limiting. One or more operations may be reordered, omitted, or added.

At block 352, the system receives, from a representative associated with an entity representative input directed to a voice bot associated with the entity via one or more communication channels for communicating with the voice bot, the representative input including one or more terms, and the voice bot being previously trained to communicate with a plurality of users on behalf of the entity via one or more of the communication channels. The representative input can be spoken input, textual input, touch input, and/or any other type of input that the representative associated with the entity can provide to modify one or more behaviors and/or one or more parameters that the voice bot utilizes in communicating with the plurality of users on behalf of the entity. Notably, the representative input is received via the same one or more communication channels with which the plurality of users can utilize to communicate with the voice bot.

At block 354, the system processes the representative input to generate responsive content that is responsive to one or more of the terms of the representative input. At block 356, the system causes the responsive content to be provided for presentation to the representative associated with the entity. For example, in implementations where the representative input corresponds to spoken input, audio data capturing the spoken input can be processed using ASR engine(s), NLU engine(s), and/or fulfillment engine(s) as described with respect to FIG. 1 to identify the one or more terms of the representative input, to determine an intent of the representative input, and/or slot values for parameters of the determined intent of the representative input, to obtain the responsive content that is responsive to the one or more terms of the representative input. In this example, the responsive content can be provided for audible and/or visual presentation to the representative via a client device that the representative utilized to provide the representative input. Also, for example, in implementations where the representative input corresponds to textual input and/or typed input, the textual input and/or typed input can be processed using NLU engine(s) and/or fulfillment engine(s) as described with respect to FIG. 1 to identify the one or more terms of the representative input and to obtain the responsive content that is responsive to the one or more terms of the representative input. Similarly, the responsive content can be provided for audible and/or visual presentation to the representative via a client device that the representative utilized to provide the representative input.

At block 358, the system receives, from the representative, additional representative input, the representative input including one or more additional terms. One or more of the additional terms of the additional representative input are in addition to one or more of the terms of the representative input. Similar to the representative input received at block 352, the additional representative input can be spoken input, textual input, touch input, and/or any other type of input that the representative associated with the entity can provide to modify one or more behaviors and/or one or more parameters that the voice bot utilizes in communicating with the plurality of users on behalf of the entity. Also similar to the representative input received at block 352, the additional representative input is received via the same one or more communication channels with which the plurality of users can utilize to communicate with the voice bot.

At block 360, the system determines whether the additional representative input corresponds to a correction of the responsive content provided for presentation to the representative associated with the entity. The system can determine whether the additional representative input corresponds to a correction of the responsive content provided for presentation to the representative associated with the entity based on an intent of the additional representative input. For example, in implementations where the representative input corresponds to spoken input, audio data capturing the spoken input can be processed using ASR engine(s), and/or NLU engine(s) as described with respect to FIG. 1 to determine whether an intent of the representative input and/or slot values for parameters of the determined intent of the representative input indicate a desire to modify one or more of the parameters of the voice bot and/or one or more of the behaviors of the voice bot. Also, for example, in implementations where the representative input corresponds to textual input and/or typed input, the textual input and/or typed input can be processed using NLU engine(s) as described with respect to FIG. 1 to determine whether an intent of the representative input and/or slot values for parameters of the determined intent of the representative input indicate a desire to modify one or more of the parameters of the voice bot and/or one or more of the behaviors of the voice bot.

If, at an iteration of block 360, the system determines that the additional representative input does not correspond to a correction of the responsive content, then the system returns to block 356 to cause additional responsive content that is responsive to one or more of the additional terms of the additional representative input to be provided for presentation to the representative associated with the entity. Moreover, and assuming that the system receives further additional representative input from the representative, the system can proceed with additional iterations of block 358 and 360 with respect to the further additional representative input.

If, at an iteration of block 360, the system determines that the additional representative input corresponds to a correction of the responsive content, then the system proceeds to block 362. At block 362, the system determines whether the representative is authorized to modify one or more of the behaviors and/or one or more of the parameters that the voice bot utilizes in communicating with the plurality of users on behalf of the entity. The system can determine whether the representative is authorized to modify one or more of the behaviors and/or one or more of the parameters that the voice bot utilizes in communicating with the plurality of users on behalf of the entity using audio-based authorization and/or non-audio-based authorization as described below with respect to FIG. 4.

If, at an iteration of block 362, the system determines that the representative is not authorized, then the system proceeds to block 364. At block 364, the system refrains from causing one or more of the behaviors and/or one or more of the parameters that the voice bot utilizes in communicating with the plurality of users on behalf of the entity to be modified based on the additional representative input. The system returns to block 352 of the method 300 of FIG. 3 to perform an additional iteration of the method 300 of FIG. 3 in response to receiving further additional representative input from the representative. For example, if the system determines that the representative is not authorized to cause the modification, then the voice bot will cause content to be presented to the representative that indicates the representative is not authorized. In this example, and assuming that the representative is authorized to modify one or more aspects of the voice bot, then the system may cause content that includes one or more modifications that the representative is authorized to cause to be provided for presentation to the representative.

If, at an iteration of block 362, the system determines that the representative is authorized, then the system proceeds to block 366. At block 366, the system causes one or more of the behaviors and/or one or more of the parameters that the voice bot utilizes in communicating with the plurality of users on behalf of the entity to be modified based on the additional representative input. At block 368, the system causes the voice bot to utilize one or more of the behaviors and/or one or more of the parameters modified based on the additional representative input (or further additional representative input) in communicating with the plurality of users via one or more of the communication channels. The system returns to block 352 of the method 300 of FIG. 3 to perform an additional iteration of the method 300 of FIG. 3 in response to receiving further additional representative input from the representative. Put another way, the system provides means for the representative to quickly and efficiently modify an existing voice bot through communication channels with which the representative is familiar such that the modifications are in place the next time another user communicates with the voice bot. However, in contrast with techniques of the method 200 of FIG. 2, techniques of the method 300 of FIG. 3 enable the representative to modify the voice bot in a more conversational manner by identifying the corrections to the responsive content.

Figure 4:
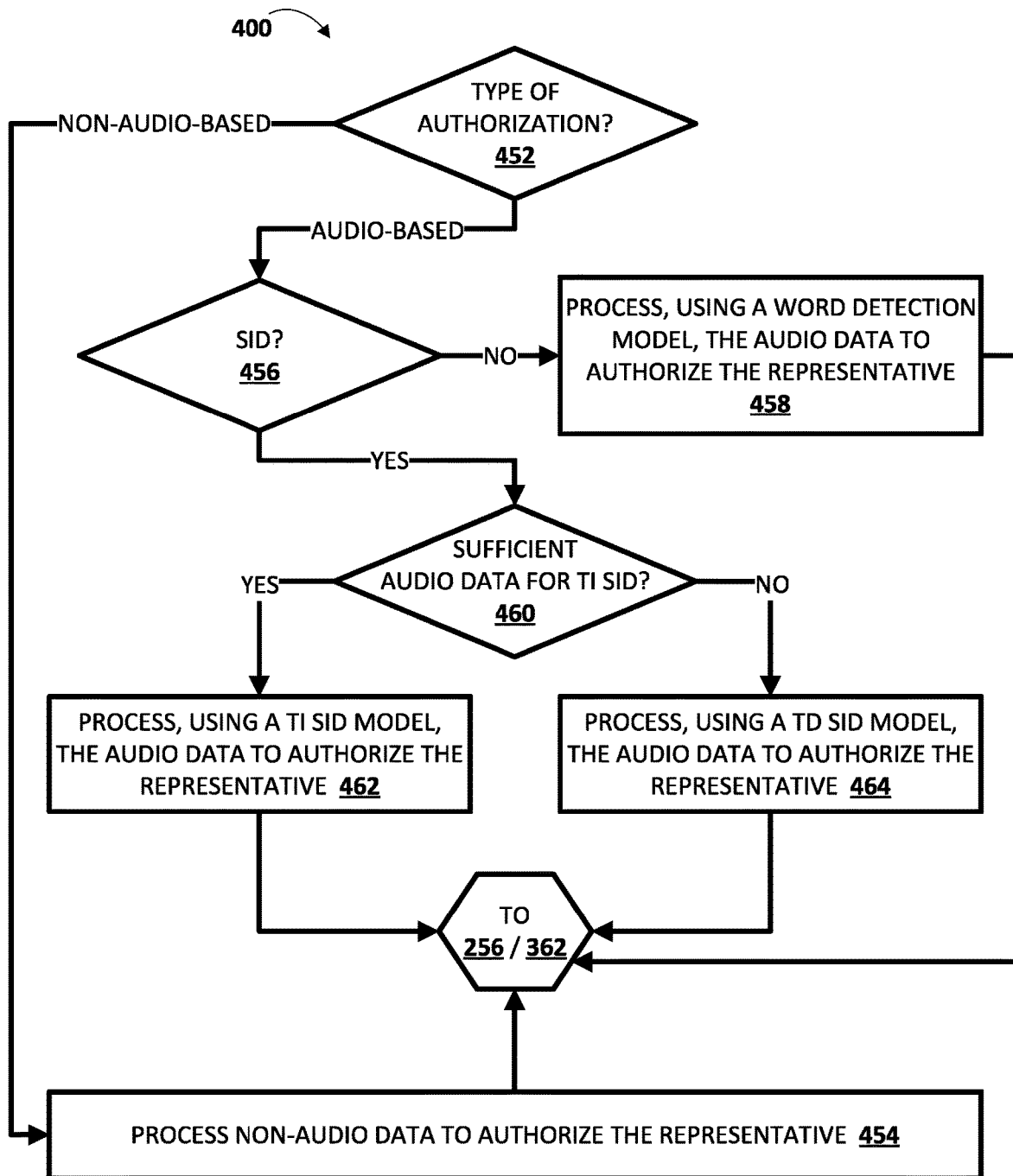
FIG. 4 depicts a flowchart illustrating an example method of causing representative authorization of a representative that provided representative input in FIG. 2 and/or FIG. 3 to be performed, in accordance with various implementations.

Turning now to FIG. 4, a flowchart illustrating an example method 400 of causing representative authorization of a representative that provided representative input in FIG. 2 and/or FIG. 3 to be performed is depicted. For convenience, the operations of method 400 are described with reference to a system that performs the operations. This system of method 400 includes one or more processors and/or other component(s) of a computing device (e.g., client device 110 of FIG. 1, client device 510A and/or 510B of FIGS. 5A-5D, computing device 610 of FIG. 6, one or more remote servers, and/or other computing devices). Moreover, while operations of method 400 are shown in a particular order, this is not meant to be limiting. One or more operations may be reordered, omitted, or added.

At block 452, the system determines a type of authorization to be performed. The type of authorization to be performed can include, for example, audio-based authorization and/or non-audio-based authorization. In some implementations, the system can determine whether to perform audio-authorization or non-audio-based authorization based on, for example, an intent or group of intents associated with representative input that triggered the authorization (e.g., the representative input received at block 254 of the method 200 of FIG. 2, the additional representative input received at block 358 of the method 300 of FIG. 3, etc.) determined based on processing the representative input. For instance, one or more first intents may require first authorization, such as audio-based authorization being required to change behavior(s) utilized by the voice bot to communicate with user(s), whereas one or more second intents may require second authorization, such as audio-based authorization and/or non-audio-based authorization being required to change parameters utilized by the voice bot to communicate with the user(s). In additional or alternative implementations, the system can determine whether to perform audio-authorization or non-audio-based authorization based on, for example, a type of the representative input that triggered the authorization. For instance, the system may perform audio-based authorization when the representative input is spoken input and perform non-audio-based authorization when the representative input is typed input and/or touch input. In additional or alternative implementations, the system can determine whether to perform audio-authorization or non-audio-based authorization based on, for example, a type of data that is readily available to perform the authorization. For instance, the system may perform audio-based authorization (e.g., SID and/or other audio-based authorization) when the representative is communicating with the voice bot over a telephone communication channel rather than non-audio-based authorization (e.g., face identification and/or other non-audio-based authorization) since the representative is already providing spoken input over the telephone communication channel. Also, for instance, the system may perform non-audio-based authorization (e.g., face identification and/or other non-audio-based authorization) when the representative is communicating with the voice bot over a software application communication channel rather than audio-based authorization (e.g., SID and/or other audio-based authorization) since vision component(s) (or other non-microphone sensor(s)) can readily generate vision data (or other non-audio data) to authorize the representative when the user is interacting with the software application.

If, at an iteration of block 452, the system determines to perform non-audio-based authorization, the system can proceed to block 454. At block 454, the system processes non-audio data to authorize the representative. The non-audio data utilized to authorize the representative can a plurality of different types of non-audio data including, for example, vision data generated by vision sensor(s) of a client device of the representative to perform face identification to authorize the representative, textual data and/or touch data generated by user interface input device(s) of the client device of the representative (e.g., a touchscreen, a mouse and keyboard, etc.) to perform password identification to authorize the representative, location data generated by location sensor(s) of the client device of the representative to perform location identification to authorize the representative, biometric data generated by biometric sensor(s) of the client device (e.g., fingerprint data) to perform other biometric identification to authorize the representative, device identifier data associated with the client device of the representative to perform device identification to authorize the representative, user account data associated with a user account of the representative, and/or any other non-audio data that may be utilized to authorize the representative that provided the representative input. In some implementations, the representative may be prompted to provide the non-audio data for authorization. In some versions of those implementations, a type of the non-audio data that the representative is prompted to provide may depend on the modification that the representative is attempting to make. For instance, one or more first intents may require first authorization, such as a password authorization or personal identification number authorization provided via textual data and/or touch data being required to authorize the representative to change hours of operation parameter(s), whereas one or more second intents may require second authorization, such as location authorization (e.g., indicating the representative is physically located as a physical address associated with the entity) and/or device identifier authorization being provided via the client device being required to authorize the representative to change menu item or inventory parameter(s). The system may return to block 256 of the method 200 if FIG. 2 or block 362 of the method 300 of FIG. 3 with an indication of whether the representative is authorized based on the processing of the non-audio data at block 454 of the method 400 of FIG. 4.

If, at an iteration of block 452, the system determines to perform audio-based authorization, the system can proceed to block 456. At block 456, the system determines whether to perform speaker identification (SID) as the audio-based authorization. In some implementations, the system can determine whether to perform SID as the audio-based authorization based on, for example, an intent or group of intents associated with representative input that triggered the authorization (e.g., the representative input received at block 254 of the method 200 of FIG. 2, the additional representative input received at block 358 of the method 300 of FIG. 3, etc.) determined based on processing the representative input. In additional or alternative implementations, the system can determine whether to perform SID as the audio-based authorization based on, for example, whether the audio data is sufficient to perform text independent (TI) SID and/or text dependent (TD) SID. The system can determine whether the audio data is sufficient to perform TI SID and/or TD SID based on features of the audio data and/or an intent or group of intents associated with representative input that triggered the authorization. For instance, some intents may require an identity of the representative be verified (e.g., using TI SID and/or TD SID), whereas other intents may require only a password or particular word or phrase to be provided (e.g., without verifying the identity of the user).

If, at an iteration of block 456, the system determines not to perform SID as the audio-based authorization, then the system proceeds to block 458. At block 458, the system processes, using a word detection model, the audio data to authorize the representative. The word detection model can be trained to detect a particular word or phrase captured in the representative input (e.g., a password, a personal identification number, etc.). In some implementations, the system can process the audio data capturing the representative input to determine whether it includes the particular word or phrase, and prompt the user to provide additional representative input in response to determining that the representative input does not include the particular word or phrase or in response to determining that the representative input does not correspond to spoken input. The system may return to block 256 of the method 200 if FIG. 2 or block 362 of the method 300 of FIG. 3 with an indication of whether the representative is authorized based on the processing of the audio data at block 458 of the method 400 of FIG. 4.

If, at an iteration of block 456, the system determines to perform SID as the audio-based authorization, then the system proceeds to block 460. At block 460, the system determines whether the audio data is sufficient to perform TI SID. The system can determine whether the audio data is sufficient to perform TI SID by comparing a length of a spoken input captured in the audio data to a threshold length. The system can determine the audio data is sufficient to perform TI SID if the spoken utterance satisfies the threshold length. If, at an iteration of block 460, the system determines the audio data is sufficient to perform TI SID, then the system can proceed to block 462. At block 462, the system processes, using a TI SID model, the audio data to authorize the representative. For example, the system can process the audio data using the TI SID model to generate a TI SID embedding. Further, the system compares, in a TI SID embedding space, the generated TI SID embedding to one or more previously generated TI SID speaker embeddings. Moreover, the system can determine, based on a distance metric determined based on the comparing, whether the TI SID speaker embedding corresponds to one or more of the previously generated TI SID speaker embeddings. If the system determines that the generated TI SID embedding sufficiently corresponds to one or more of the previously generated TI SID speaker embeddings, the system may determine that the representative that provided the representative input is authorized. Otherwise, the system may determine that the representative is not authorized. The system may return to block 256 of the method 200 if FIG. 2 or block 362 of the method 300 of FIG. 3 with an indication of whether the representative is authorized based on the processing of the audio data at block 462 of the method 400 of FIG. 4.

If, at an iteration of block 460, the system determines the audio data is not sufficient to perform TI SID, then the system can proceed to block 464. At block 464, the system processes, using a TD SID model, the audio data to authorize the representative. For example, the system can process the audio data using the TD SID model to generate a TD SID speaker embedding. Further, the system compares, in a TD SID embedding space, the generated TD SID speaker embedding to one or more previously generated TD SID speaker embeddings. Notably, the TD SID speaker embedding corresponds to a speaker embedding for one or more particular words and/or phrases (e.g., one or more of the particular words or phrases monitored for at block 458 using the word detection model and/or one or more additional particular words or phrases). Moreover, the system can determine, based on a distance metric determined based on the comparing, whether the TD speaker embedding corresponds to one or more of the previously generated TD speaker embeddings for one or more of the particular words and/or phrases. If the system determines the distance metric satisfies a distance threshold, the system may determine that the representative that provided the representative input is authorized. Otherwise, the system may determine that the representative is not authorized. The system may return to block 256 of the method 200 if FIG. 2 or block 362 of the method 300 of FIG. 3 with an indication of whether the representative is authorized based on the processing of the audio data at block 464 of the method 400 of FIG. 4.

Notably, in various implementations, the system can prompt the user that provided the representative input to provide various additional representative inputs in authorizing the representative. For example, when the system determines to perform non-audio-based authorization, the system can prompt the representative to provide various non-audio-based inputs. Also, for example, when the system determines to perform audio-based authorization, the system can prompt the representative to provide various audio-based inputs. Accordingly, the representative can be authorized using various techniques described herein.

Figure 5A:
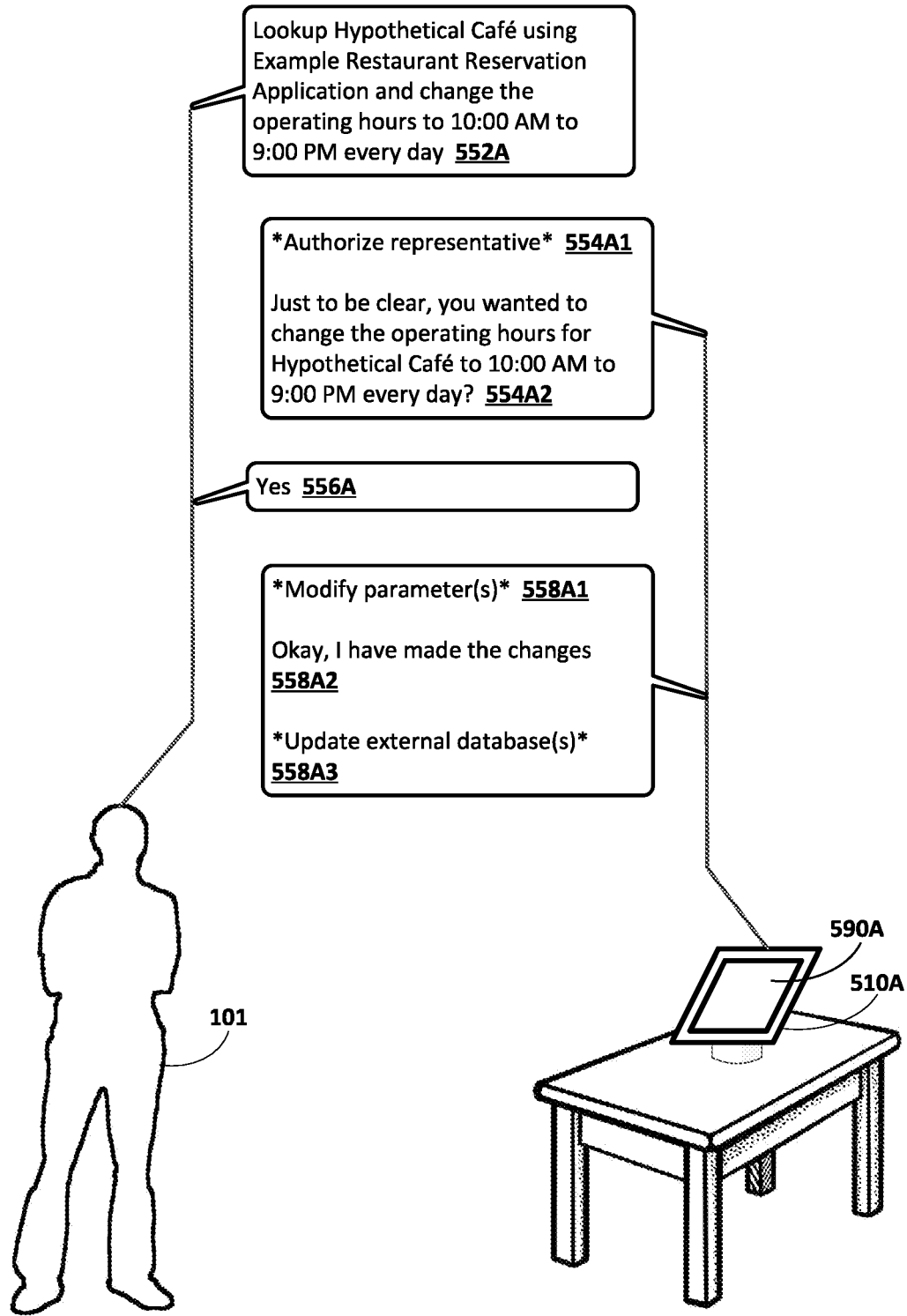
FIG. 5A, FIG. 5B, FIG. 5C, and FIG. 5D depict various non-limiting examples of interactions to modify a voice bot based on representative input received via one or more communication channels for communicating with the voice bot, in accordance with various implementations.
Figure 5B:
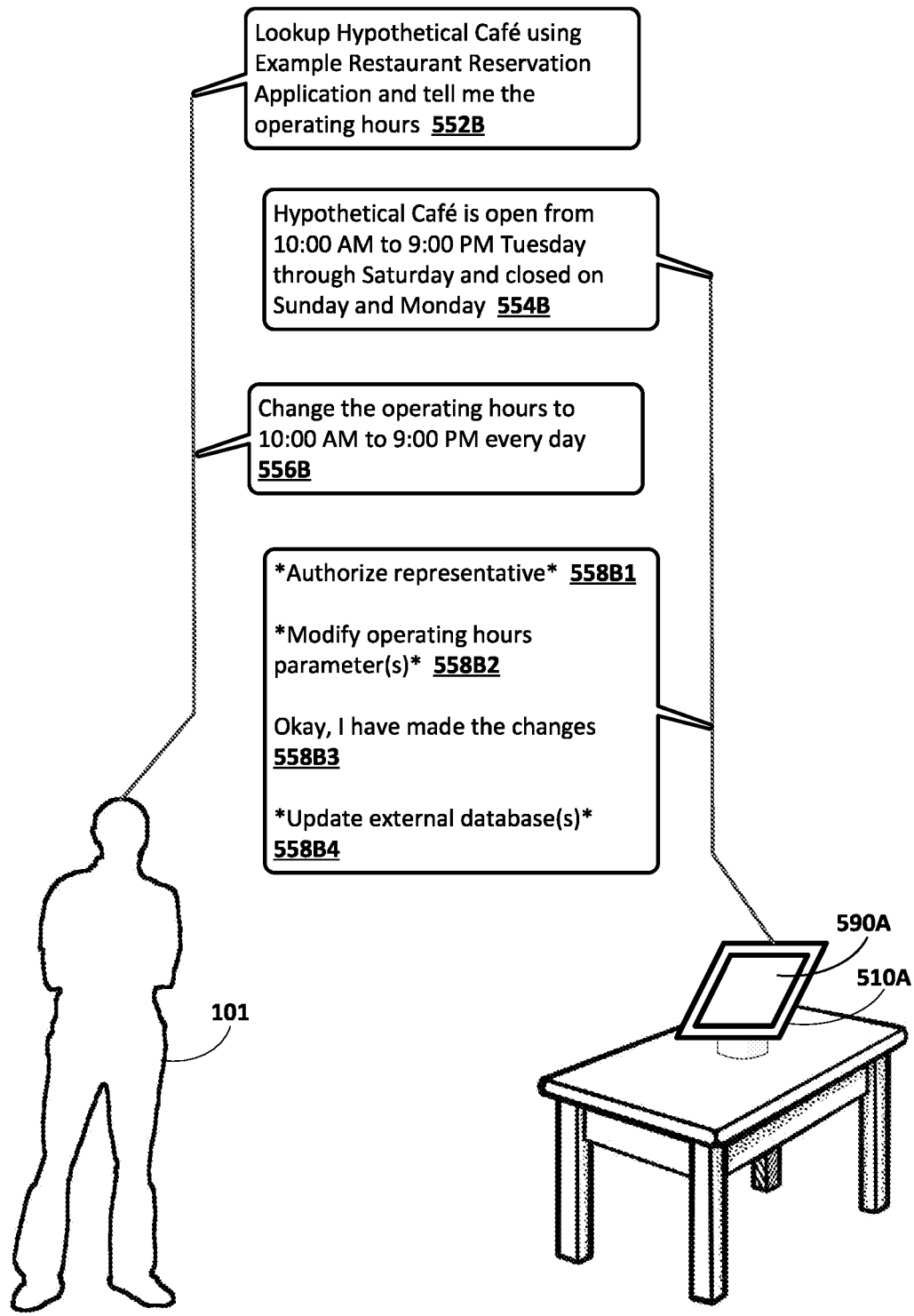
Figure 5C:
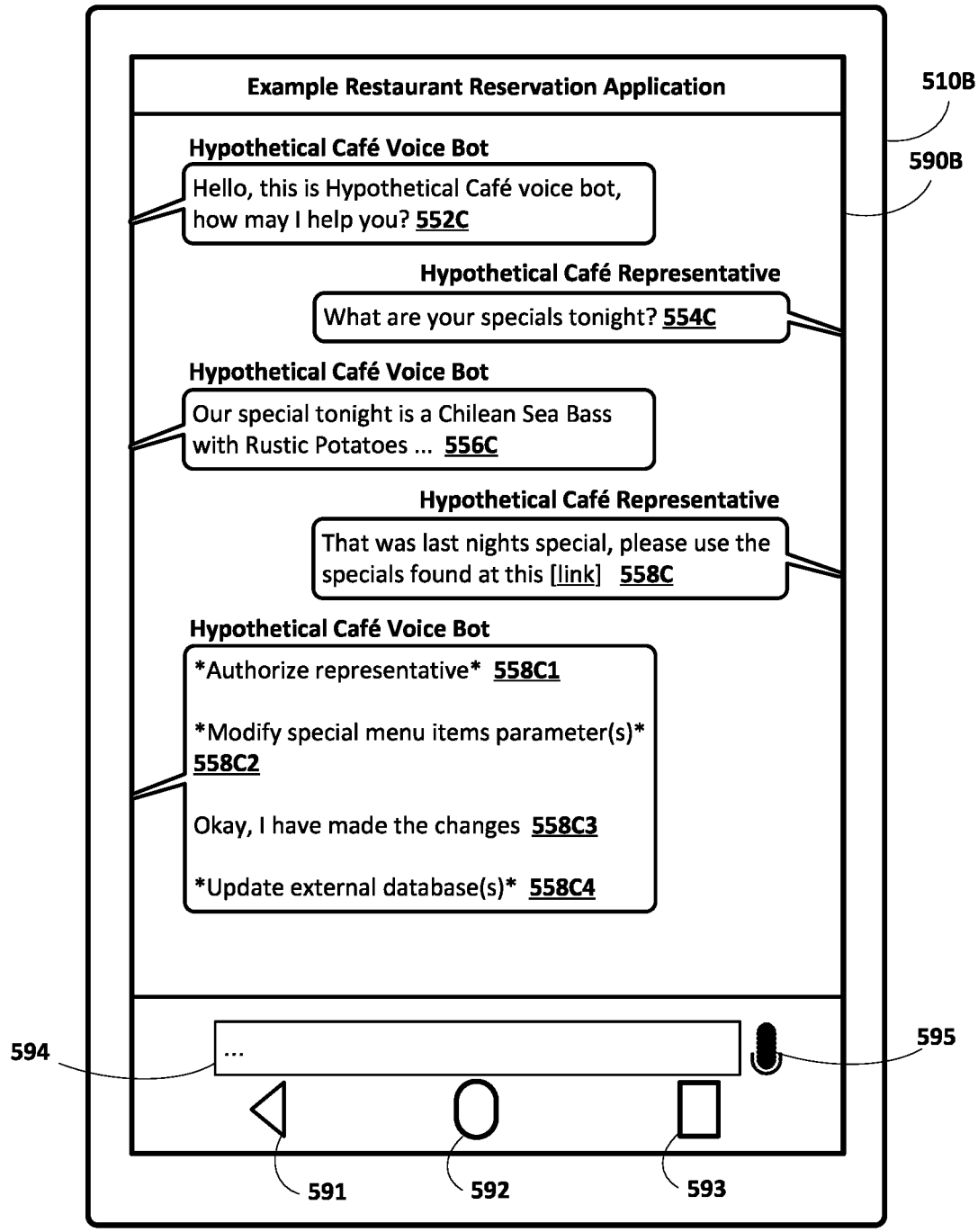
Figure 5D:
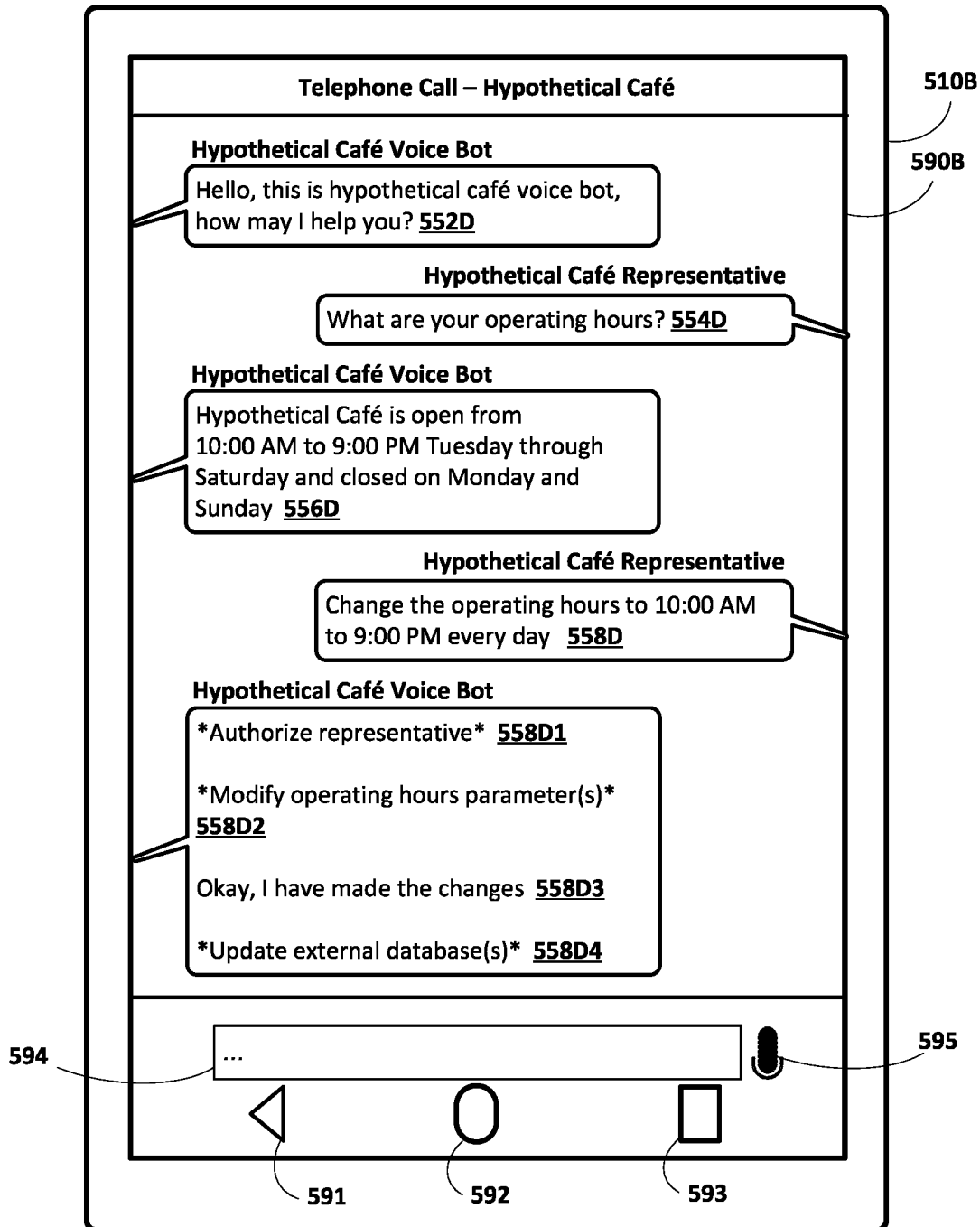

Referring now to FIGS. 5A-5D, various non-limiting examples of interactions to modify a voice bot based on representative input received via one or more communication channels for communicating with the voice bot are depicted. FIGS. 5A and 5B depict a client device 510A as a stand-alone interactive speaker having a display 590A. Further, FIGS. 5C and 5D depict a client device 510B as a mobile phone having a display 590B. The display 590B of FIGS. 5C and 5D further includes a textual reply interface element 594 that the representative may select to generate textual input via a virtual keyboard and a voice reply interface element 595 that the representative may select to provide spoken input via microphone(s) of the client device 510B. In some implementations, the user may generate user input via the microphone(s) without selection of the voice reply interface element 595. For example, active monitoring for spoken input via the microphone(s) may occur to obviate the need for the user to select the voice reply interface element 595. In some of those and/or in other implementations, the voice reply interface element 595 may be omitted. Moreover, in some implementations, the textual reply interface element 594 may additionally and/or alternatively be omitted. The display 590B of the client device 510B also includes system interface elements 591, 592, and 593 that may be interacted with by the representative to cause the computing device 510B to perform one or more actions. Although the client devices 510A and 510B of FIGS. 5A-5D are depicted as a stand-alone interactive speaker having a display and as a mobile phone, respectively, it should be understood that for the sake of example and is not meant to be limiting. For example, additional or alternative client devices may be provided.

Referring specifically to FIG. 5A, assume that a representative 101 associated with Hypothetical Café—a fictitious restaurant—provides spoken input 552A of "Lookup Hypothetical Café using Example Restaurant Reservation Application and change the operating hours to 10:00 AM to 9:00 PM every day." In this example, audio data capturing the spoken input 552A can be processed using ASR engine(s), NLU engine(s), and/or fulfillment engine(s) as described with respect to FIG. 1. For example, the audio data capturing the spoken input 552A can be processed using the ASR engine(s) to generate recognized text that is predicted to correspond to the spoken input 552A (e.g., a transcript corresponding to the spoken input 552A). Further, the recognized text can be processed using the NLU engine(s) to determine a first intent to launch a software application of Example Restaurant Reservation Application with a slot value of Hypothetical Café for a restaurant parameter associated with the first intent, and a second intent to modify a voice bot associated with Hypothetical Café with a slot value of 9:00 AM to 10:00 PM for an operating hours time parameter associated with the second intent and a slot value of every day for an operating hours day parameter associated with the second intent. Notably, in this example, the communications channel for communicating with the voice bot associated with Hypothetical Café is a software application communications channel (e.g., Example Restaurant Reservation Application). Further, in this example, the representative 101 accesses the software application communications channel using an automated assistant executing at least in part at the client device 510A.

Further assume that automated assistant executing at least in part at the client device 510A causes the Example Restaurant Reservation Application to be launched to Hypothetical Café based on the first intent. Also, further assume the automated assistant executing at least in part at the client device 510A causes the voice bot associated with Hypothetical Café to be invoked based on the second intent while passing the slot value of 9:00 AM to 10:00 PM for the operating hours time parameter associated with the second intent and the slot value of every day for the operating hours day parameter associated with the second intent. The voice bot associated with Hypothetical Café can authorize the representative 101 by using any audio-based techniques and/or any non-audio-based techniques described herein (e.g., with respect to the authorization engine 163 of FIG. 1, the method 400 of FIG. 4, etc.). For instance, the voice bot can cause SID to be performed on the spoken input 552A for authorization or prompt the user to provide additional spoken input to cause SID to be performed on the additional spoken input for authorization. Also, for instance, the voice bot can process vision data and/or other biometric data to perform face identification and/or fingerprint identification for authorization. Also, for instance, the voice bot can prompt the user to provide a password or personal identification number for authorization.

Moreover, further assume that the representative 101 is authorized as indicated by 554A1. In this example, the voice bot can generate synthesized speech 554A2 that includes a prompt of "Just to be clear, you wanted to change the operating hours for Hypothetical Café to 10:00 AM to 9:00 PM every day?", and can cause synthesized speech audio data capturing the synthesized speech 554A2 to be audibly presented to the representative 101 via speaker(s) of the client device 510A and/or text corresponding to the synthesized speech 554A2 to be visually presented to the representative 101 via the display 590A of the client device 510A. The prompt enables the representative 101 to review and confirm the modifications that are to be made to the voice bot based on the spoken input 552A. Further assume that the representative 101 responds to the prompt by providing additional spoken input 556A of "Yes" to confirm the modifications to be made to the voice.

In this example, and as indicated by 558A1, the voice bot can modify the operating hours time parameter associated with the second intent and the slot value of every day for the operating hours day parameter associated with the second intent. Further, the voice bot can generate additional synthesized speech 558A2 of "Okay, I have made the changes", and can cause synthesized speech audio data capturing the synthesized speech 558A2 to be audibly presented to the representative 101 via speaker(s) of the client device 510A and/or text corresponding to the synthesized speech 558A2 to be visually presented to the representative 101 via the display 590A of the client device 510A. Accordingly, when users subsequently communicate with the voice bot associated with Hypothetical Café on the Example Restaurant Reservation Application, over the telephone, and/or over any other communication channel and request operating hours of Hypothetical Café for any given day, the voice bot can utilize the parameter(s) modified in the example of FIG. 5A in responding to the users. Moreover, the voice bot can cause one or more external databases to be updated as indicated by 558A3. The one or more external databases can include databases that are utilized by software applications, such as knowledge graphs, remote memory, and/or any other database. Accordingly, when users subsequently access these external databases or utilize software applications that access these external databases, the information included in these databases is up-to-date. For instance, if a user subsequently views Hypothetical Café in a navigation application that includes a snippet of information about Hypothetical Café, then the operating hours included in the snippet accurately reflect those provided by the representative 101 and without the representative 101 having to perform any action directed to the navigation application.

Although the example of FIG. 5A is described with respect to the representative 101 providing the spoken input 552A as a command to modify the parameter(s) of the voice bot and without engaging in any substantive dialog with the voice bot, it should be understood that is for the sake of example and is not meant to be limiting. For example, and referring specifically to FIG. 5B, assume instead that the representative 101 provides spoken input 552B of "Lookup Hypothetical Café using Example Restaurant Reservation Application and tell me the operating hours." In this example, audio data capturing the spoken input 552B can be processed in the same or similar manner described above with respect to FIG. 5A. However, in the example of FIG. 5B, the second intent may be a lookup intent with a slot value of operating hours for a lookup parameter associated with the second intent, rather than the second intent to modify a voice bot associated with Hypothetical Café. Accordingly, the voice bot can obtain responsive content and generate synthesized speech 554B of "Hypothetical Café is open from 10:00 AM to 9:00 PM Tuesday through Saturday and closed on Sunday and Monday", and can cause synthesized speech audio data capturing the synthesized speech 554B to be audibly presented to the representative 101 via speaker(s) of the client device 510A and/or text corresponding to the synthesized speech 554B to be visually presented to the representative 101 via the display 590A of the client device 510A.

However, in the example of FIG. 5B, further assume that the representative 101 provides additional spoken input 556B of "Change the operating hours to 10:00 AM to 9:00 PM every day" (e.g., including Sunday and Monday when Hypothetical Café was previously closed). Similar to FIG. 5A, the voice bot associated with Hypothetical Café can authorize the representative 101 by using any audio-based techniques and/or any non-audio-based techniques described herein (e.g., with respect to the authorization engine 163 of FIG. 1, the method 400 of FIG. 4, etc.). Moreover, further assuming that the representative 101 is authorized as indicated by 558B1. In this example, and as indicated by 558B2, the voice bot can modify the parameter(s) and optionally without prompting the representative 101 for confirmation. Further, the voice bot can generate additional synthesized speech 558B3 of "Okay, I have made the changes", and can cause synthesized speech audio data capturing the synthesized speech 558B3 to be audibly presented to the representative 101 via speaker(s) of the client device 510A and/or text corresponding to the synthesized speech 558A2 to be visually presented to the representative 101 via the display 590A of the client device 510A. Moreover, the voice bot can cause one or more external databases to be updated as indicated by 558B4. Accordingly, various techniques are described herein for enabling representatives associated with entities to quickly and efficiently modify voice bots through natural language interactions with the voice bot.

Further, although the examples of FIGS. 5A and 5B are described with respect to the representative 101 communicating with the voice bot using spoken input, it should be understood that is for the sake of example and is not meant to be limiting. For example, and referring specifically to FIG. 5C, assume instead that the representative 101 provides touch input at the client device 510B to initiate a dialog with the voice bot, and assume that the voice bot generates textual content 552C of "Hello, this is Hypothetical Café voice bot, how may I help you?" as a greeting, and can cause the textual content 552C to be visually presented to the representative 101 via the display 590B of the client device 510B. Further assume that the representative provides typed input 554C of "What are your specials tonight?" In this example, the typed input 554C can be processed in the same or similar manner described above with respect to FIG. 5A (e.g., using the NLU engine(s)). However, in the example of FIG. 5C, the intent may be a lookup intent with a slot value of special menu items for a lookup parameter. Accordingly, the voice bot can obtain responsive content and generate additional textual content 556C of "Our special tonight is a Chilean Sea Bass with Rustic Potatoes . . . ", can cause the additional textual content 556C to be visually presented to the representative 101 via the display 590B of the client device 510B.

In this example, further assume that the representative 101 provides further additional typed input 558C of "That was last night's special, please use the specials found at this [link]". Similar to FIGS. 5A and 5B, the voice bot associated with Hypothetical Café can authorize the representative 101 by using any audio-based techniques and/or any non-audio-based techniques described herein (e.g., with respect to the authorization engine 163 of FIG. 1, the method 400 of FIG. 4, etc.). Moreover, further assuming that the representative 101 is authorized as indicated by 558BC1. In this example, and as indicated by 558C2, the voice bot can modify the parameter(s) and optionally without prompting the representative 101 for confirmation. Further, the voice bot can generate further additional textual content 558C3 of "Okay, I have made the changes", and can cause the further additional textual content 558C3 to be visually presented to the representative 101 via the display 590B of the client device 510B. Moreover, the voice bot can cause one or more external databases to be updated as indicated by 558C4. Accordingly, various techniques are described herein for enabling representatives associated with entities to quickly and efficiently modify voice bots through natural language interactions with the voice bot.

Notably, in the example of FIG. 5C, the representative 101 provides a link to a webpage or electronic document that includes the desired special menu items. Accordingly, when users subsequently communicate with the voice bot and request special menu items, the voice bot can access the webpage or the electronic document to cause the special menu items to be provided for presentation to the user. Moreover, and although not depicted in FIG. 5C, the representative 101 may additionally or alternatively provide pronunciations of special menu items (or other content) and/or provide spoken input that the voice bot causes to be played back to the user when the user requests special menu items (or other content).

Moreover, although the examples of FIGS. 5A-5C are described with respect to the representative 101 communicating with the voice bot through a software application communication channel, it should be understood that is for the sake of example and is not meant to be limiting. For example, and referring specifically to FIG. 5D, assume instead that the representative 101 initiates a phone call at the client device 510B using a telephone number associated with Hypothetical Café. In this example, the voice bot associated with Hypothetical Café can answer the incoming phone call on behalf of Hypothetical Café and provide a greeting by generating synthesized speech 552D, and causing synthesized speech audio data capturing the synthesized speech 552D to be audibly presented to the representative 101 via speaker(s) of the client device 510B and over a PSTN network.

In the example of FIG. 5D, and similar to the example of FIG. 5B, the intent may be a lookup intent with a slot value of operating hours for a lookup parameter associated with the second intent, rather than the second intent to modify a voice bot associated with Hypothetical Café. Accordingly, the voice bot can obtain responsive content and generate synthesized speech 554B of "Hypothetical Café is open from 10:00 AM to 9:00 PM Tuesday through Saturday and closed on Sunday and Monday", and can cause synthesized speech audio data capturing the synthesized speech 552D to be audibly presented to the representative 101 via speaker(s) of the client device 510B (and optionally text corresponding to the synthesized speech 552D to be visually presented to the representative 101 via the display 590B of the client device 510B). Further assume that the representative 101 provides spoken input 554D of "What are your operating hours?" In this example, audio data capturing the spoken input 554D can be processed in the same or similar manner described above with respect to FIG. 5A. However, in the example of FIG. 5D and similar to the example of FIG. 5B, the intent may be a lookup intent with a slot value of operating hours for a lookup parameter associated with the intent. Accordingly, the voice bot can obtain responsive content and generate synthesized speech 556D of "Hypothetical Café is open from 10:00 AM to 9:00 PM Tuesday through Saturday and closed on Sunday and Monday", and can cause synthesized speech audio data capturing the synthesized speech 556D to be audibly presented to the representative 101 via speaker(s) of the client device 510B and/or text corresponding to the synthesized speech 554B to be visually presented to the representative 101 via the display 590A of the client device 510A.

However, in the example of FIG. 5D, further assume that the representative 101 provides additional spoken input 558D of "Change the operating hours to 10:00 AM to 9:00 PM every day" (e.g., including Sunday and Monday when Hypothetical Café was previously closed). Similar to FIG. 5B, the voice bot associated with Hypothetical Café can authorize the representative 101 by using any audio-based techniques and/or any non-audio-based techniques described herein (e.g., with respect to the authorization engine 163 of FIG. 1, the method 400 of FIG. 4, etc.). Moreover, further assuming that the representative 101 is authorized as indicated by 558D1. In this example, and as indicated by 558D2, the voice bot can modify the parameter(s) and optionally without prompting the representative 101 for confirmation. Further, the voice bot can generate additional synthesized speech 558D3 of "Okay, I have made the changes", and can cause synthesized speech audio data capturing the synthesized speech 558D3 to be audibly presented to the representative 101 via speaker(s) of the client device 510D (and optionally text corresponding to the synthesized speech 558D3 to be visually presented to the representative 101 via the display 590B of the client device 510B). Moreover, the voice bot can cause one or more external databases to be updated as indicated by 558D4. Accordingly, various techniques are described herein for enabling representatives associated with entities to quickly and efficiently modify voice bots through natural language interactions with the voice bot.

Although the examples of FIGS. 5A-5D are described with respect to a voice bot associated with a restaurant and with respect to modifying particular parameter(s), it should be understood that is for the sake of example and is not meant to be limiting. For instance, the parameter(s) can additionally or alternatively include seating option parameter(s), reservation availability parameter(s), and/or any other parameter(s) associated with any other intent(s) that the voice bot has been trained to handle. Further, it should be understood that the representative 101 can provide similar representative inputs to additionally or alternatively cause behavior(s) of the voice bot to be modified. For instance, assume that Hypothetical Café is an Italian restaurant. In this example, the representative 101 can provide representative input that causes the voice bot to adopt an Italian chef personality in that the voice bot will subsequently utilize a vocabulary of an Italian chef (and optionally leveraging LM(s)) and prosodic properties in synthesizing speech that reflect those of an Italian chef.

Figure 6:
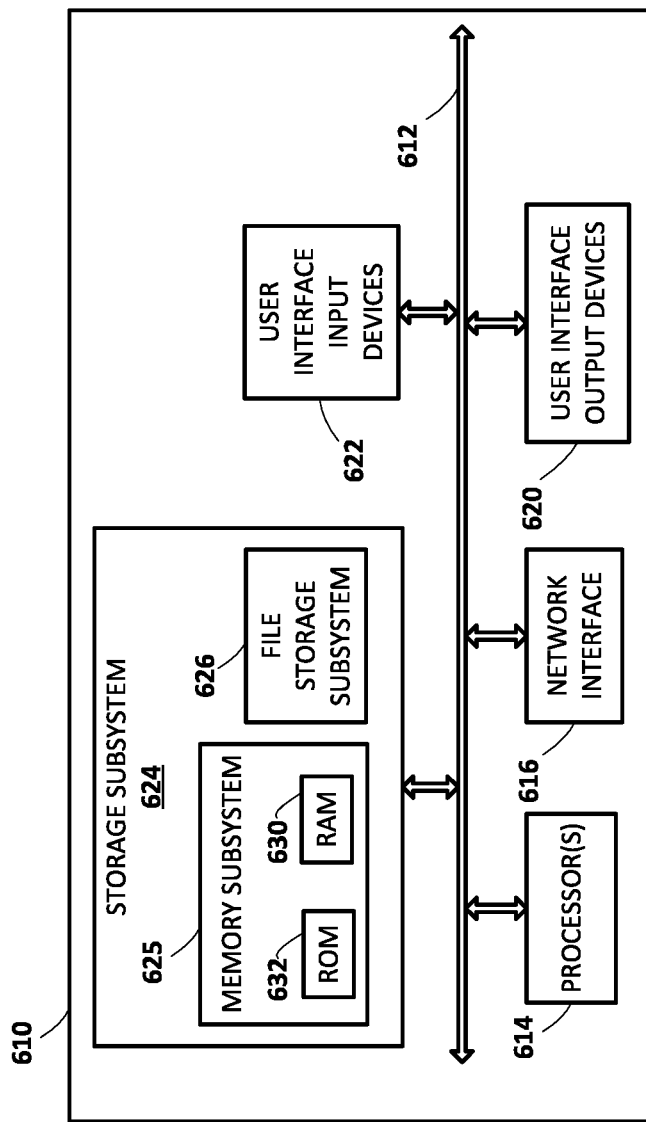
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes identifying a voice bot associated with an entity, the voice bot being previously trained to communicate with a plurality of users on behalf of the entity via one or more communication channels for communicating with the voice bot; receiving, from a representative associated with the entity, representative input to modify one or more parameters that the voice bot utilizes in communicating with the plurality of users on behalf of the entity, the representative input being received via one or more of the communication channels for communicating with the voice bot; in response to receiving the representative input to modify one or more of the parameters that the voice bot utilizes in communicating with the plurality of users on behalf of the entity: determining whether the representative that provided the representative input is authorized to cause one or more of the parameters that the voice bot utilizes in communicating with the plurality of users on behalf of the entity to be modified; and in response to determining that the representative that provided the representative input is authorized to cause one or more of the parameters that the voice bot utilizes in communicating with the plurality of users on behalf of the entity to be modified: causing one or more of the parameters that the voice bot utilizes in communicating with the plurality of users on behalf of the entity to be modified based on the representative input.

These and other implementations of technology disclosed herein can optionally include one or more of the following features.

In some implementations, the method may further include, subsequent to causing one or more of the parameters that the voice bot utilizes in communicating with the plurality of users on behalf of the entity to be modified based on the representative input: receiving, from a given user of the plurality of users, an incoming electronic communication to communicate with the voice bot associated with the entity via one or more of the communication channels; and causing the voice bot to utilize one or more of the parameters modified based on the representative input in generating an outgoing electronic communication that is responsive to the incoming electronic communication.

In some implementations, the representative input to modify one or more of the parameters that the voice bot utilizes in communicating with the plurality of users on behalf of the entity may be spoken input received via one or more of the communication channels for communicating with the voice bot.

In some versions of those implementations, the spoken input may be received from the representative associated with the via a telephone communication channel that the plurality of users utilize to communicate with the entity.

In additional or alternative versions of those implementations, determining whether the representative that provided the representative input is authorized to cause one or more of the parameters that the voice bot utilizes in communicating with the plurality of users on behalf of the entity to be modified may include processing, using a speaker identification (SID) model, audio data that captures the spoken input to determine whether the audio data is sufficient to authorize the representative that provided the spoken input.

In some further versions of those implementations, processing, using the SID model, the audio data that captures the spoken input to determine whether the audio data is sufficient to authorize the representative that provided the spoken input may include processing, using a text dependent (TD) SID model as the SID model, the audio data to generate a TD speaker embedding. Determining whether the audio data is sufficient to authorize the representative that provided the spoken input may include comparing, in a TD SID embedding space, the TD speaker embedding to one or more stored TD speaker embeddings; and determining, based on comparing the TD speaker embedding to the one or more stored TD speaker embeddings, whether the audio data is sufficient to authorize the representative that provided the spoken input.

In yet further versions of those implementations, processing, using the SID model, the audio data that captures the spoken input to determine whether the audio data is sufficient to authorize the representative that provided the spoken input further may include in response to determining that the spoken input is a sufficient length to perform text independent (TI) SID: processing, using a TI SID model as the SID model, the audio data to generate a TI speaker embedding. Determining whether the audio data is sufficient to authorize the representative that provided the spoken input may include comparing, in a TI SID embedding space, the TI speaker embedding to one or more stored TI speaker embeddings; and determining, based on comparing the TI speaker embedding to the one or more stored TI speaker embeddings, whether the audio data is sufficient to authorize the representative that provided the spoken input.

In additional or alternative versions of those implementations, determining whether the representative that provided the representative input is authorized to cause one or more of the parameters that the voice bot utilizes in communicating with the plurality of users on behalf of the entity to be modified may include processing, using a word detection model, audio data that captures the spoken input to determine whether the spoken input includes a particular word or phrase that authorizes the representative that provided the representative input.

In some implementations, the representative input to modify one or more of the parameters that the voice bot utilizes in communicating with the plurality of users on behalf of the entity may be textual input received via one or more of the communication channels for communicating with the voice bot. In some versions of those implementations, the textual input may be received from the representative associated with the via a software application communication channel that the plurality of users utilize to communicate with the entity. In additional or alternative versions of those implementations, determining whether the representative that provided the representative input is authorized to cause one or more of the parameters that the voice bot utilizes in communicating with the plurality of users on behalf of the entity to be modified may include determining whether the textual input includes a particular word or phrase that authorizes the representative that provided the representative input.

In some implementations, determining whether the representative that provided the representative input is authorized to cause one or more of the parameters that the voice bot utilizes in communicating with the plurality of users on behalf of the entity to be modified may include determining whether a device identifier of a client device utilized by the representative to provide the representative input is authorized device identifier for causing one or more of the parameters that the voice bot utilizes in communicating with the plurality of users on behalf of the entity to be modified.

In some implementations, determining whether the representative that provided the representative input is authorized to cause one or more of the parameters that the voice bot utilizes in communicating with the plurality of users on behalf of the entity to be modified may include processing, using a face identification model, vision data that captures the representative that provided the representative input to determine whether the vision data is sufficient to authorize the representative that provided the representative input. Determining whether the vision data is sufficient to authorize the representative that provided the representative input may include processing, using the face identification model, the vision data to generate a face embedding; comparing, in a face embedding space, the face embedding to one or more stored face embeddings; and determining, based on comparing the face embedding to the one or more stored face embeddings, whether the vision data is sufficient to authorize the representative that provided the representative input.

In some implementations, determining whether the representative that provided the representative input is authorized to cause one or more of the parameters that the voice bot utilizes in communicating with the plurality of users on behalf of the entity to be modified may include determining whether a location of a client device utilized by the representative to provide the representative input is authorized location for causing one or more of the parameters that the voice bot utilizes in communicating with the plurality of users on behalf of the entity to be modified.

In some implementations, the representative input to modify one or more of the parameters that the voice bot utilizes in communicating with the plurality of users on behalf of the entity may further include a temporal indicator. The temporal indicator may indicate a duration of time that the voice bot should utilize one or more of the parameters that were modified in communicating with the plurality of users on behalf of the entity.

In some implementations, the method may further include, in response to causing one or more of the parameters that the voice bot utilizes in communicating with the plurality of users on behalf of the entity to be modified based on the representative input: causing one or more publicly accessible external databases to be updated, the one or more publicly accessible external databases being accessible to the plurality of users. In some versions of those implementations, the method may further include, subsequent to causing one or more publicly accessible external databases to be updated, the one or more publicly accessible external databases being accessible to the plurality of users: receiving, from a given user of the plurality of users, a query that is related to the entity; and in response to receiving the query that is related to the entity: executing the query over one or more of the publicly accessible external databases; obtaining responsive content that is responsive to the query, the responsive content including at least some content that is based on one or more of the parameters; and causing the responsive content to be provided for presentation to the given user.

In some implementations, the method may further include, in response to determining that the representative that provided the representative input is not authorized to cause one or more of the parameters to be modified: refraining from causing one or more of the parameters that the voice bot utilizes in communicating with the plurality of users on behalf of the entity to be modified based on the representative input. In some versions of those implementations, the representative that provided the representative input may be authorized to modify a first set of parameters, of the one or more parameters, but is not authorized to modify a second set of parameters, of the one or more parameters.

In some implementations, each of the one or more parameters that the voice bot utilizes in communicating with the plurality of users on behalf of the entity may include one or more of: a corresponding slot value associated with a corresponding intent, the corresponding slot value being solicitable by the plurality of users via one or more of the communication channels, a corresponding link associated with a corresponding document, the corresponding document including information that is solicitable by the plurality of users via one or more of the communication channels, a set of corresponding prosodic properties to be utilized in generating corresponding outgoing electronic communication that are responsive to corresponding incoming electronic communications initiated by a given user of the plurality of users, or a corresponding language to be utilized in generating corresponding outgoing electronic communication that are responsive to corresponding incoming electronic communications initiated by a given user of the plurality of users.

In some implementations, the method may further include, prior to causing one or more of the parameters that the voice bot utilizes in communicating with the plurality of users on behalf of the entity to be modified based on the representative input: generating a prompt that requests the representative associated with the entity verify one or more of the parameters to be modified based on the representative input; and causing the prompt to be provided for presentation to the representative associated with the entity. Causing one or more of the parameters that the voice bot utilizes in communicating with the plurality of users on behalf of the entity to be modified based on the representative input may be further in response to receiving confirmation, from the representative associated with the entity, of one or more of the parameters to be modified.

In some implementations, causing one or more of the parameters that the voice bot utilizes in communicating with the plurality of users on behalf of the entity to be modified based on the representative input may include identifying one or more of the parameters in a database that is accessible to the voice bot; and causing one or more of the parameters in the database to be modified based on the representative input.

In some implementations, a method implemented by one or more processors is provided, and includes receiving, from a representative associated with an entity, representative input directed to a voice bot associated with the entity via one or more communication channels for communicating with the voice bot, the representative input including one or more terms, and the voice bot being previously trained to communicate with a plurality of users on behalf of the entity via one or more of the communication channels; processing the representative input to generate responsive content that is responsive to one or more of the terms of the representative input; causing the responsive content to be provided for presentation to the representative associated with the entity; receiving, from the representative, an additional representative input, the additional representative input including one or more additional terms; and in response to determining that one or more of the additional terms include a correction to the responsive content: causing one or more parameters that the voice bot utilizes in communicating with the plurality of users on behalf of the entity to be modified based on one or more of the additional terms of the additional incoming electronic communication.

These and other implementations of technology disclosed herein can optionally include one or more of the following features.

In some implementations, in response to determining that one or more of the additional terms include a correction to the responsive content, the method may further include determining whether the representative is authorized to cause one or more of the parameters that the voice bot utilizes in communicating with the plurality of users on behalf of the entity to be modified. Causing one or more parameters that the voice bot utilizes in communicating with the plurality of users on behalf of the entity to be modified based on one or more of the additional terms of the additional incoming electronic communication may be further in response to determining that the representative is authorized to cause one or more of the parameters that the voice bot utilizes in communicating with the plurality of users on behalf of the entity to be modified.

In some implementations, the representative input may be spoken input received via one or more of the communication channels for communicating with the voice bot.

In some versions of those implementations, the method may further include processing, using an automatic speech recognition (ASR) model, audio data capturing the spoken input to generate ASR data, the ASR data identifying the one or more terms of the representative input. In some further versions of those implementations, processing the representative input to generate responsive content that is responsive to one or more of the terms of the representative input may include processing, using a natural language understanding (NLU) model, one or more of the terms of the representative input to generate NLU data; and processing the NLU data to identify the responsive content that is responsive to one or more of the terms of the representative input. Processing the NLU data to identify the responsive content that is responsive to one or more of the terms of the representative input may include identifying one or more of the parameters in a database that is accessible to the voice bot; and utilizing one or more of the parameters to generate the responsive content.

In additional or alternative versions of those implementations, causing the responsive content to be provided for presentation to the representative associated with the entity may include generating, based on the responsive content, synthesized speech audio data capturing synthesized speech including the responsive content; and causing the synthesized speech audio data to be provided for audible presentation to the representative.

In additional or alternative versions of those implementations, determining that one or more of the additional terms include the correction to the responsive content may include determining that one or more of the parameters in the database that is accessible to the voice bot differ from one or more of the additional terms; and in response to determining that one or more of the parameters in the database that is accessible to the voice bot differ from one or more of the additional terms, determining that one or more of the additional terms include the correction to the responsive content.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Other implementations also include one or more non-transitory computer readable storage media storing computer instructions executable by one or more processors to perform any of the aforementioned methods. Yet other implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   identifying a voice bot associated with an entity, the voice bot being previously trained to communicate with a plurality of users on behalf of the entity via one or more communication channels for communicating with the voice bot;
   subsequent to the voice bot being previously trained to communicate with the plurality of users on behalf of the entity:
      receiving, from a representative associated with the entity, representative input to modify one or more parameters that the voice bot utilizes in communicating with the plurality of users on behalf of the entity, the representative input being received via a telephone communication channel, from among the one or more communication channels, that the plurality of users utilize to communicate with the entity, and the representative input being spoken input that is spoken by representative associated with the entity and via the telephone communication channel;
      in response to receiving the representative input to modify one or more of the parameters that the voice bot that was previously trained to communicate with the plurality of users on behalf of the entity:
         determining whether the representative associated with the entity that provided the representative input is authorized, on behalf of the entity, to cause one or more of the parameters that the voice bot utilizes in communicating with the plurality of users on behalf of the entity to be modified; and
      in response to determining that the representative associated with the entity that provided the representative input is authorized, on behalf of the entity, to cause one or more of the parameters that the voice bot utilizes in communicating with the plurality of users on behalf of the entity to be modified:
         causing one or more of the parameters that the voice bot utilizes in communicating with the plurality of users on behalf of the entity to be modified based on the representative input.

2. The method of claim 1, further comprising:
   subsequent to causing one or more of the parameters that the voice bot utilizes in communicating with the plurality of users on behalf of the entity to be modified based on the representative input:
      receiving, from a given user of the plurality of users, an incoming electronic communication to communicate with the voice bot associated with the entity via one or more of the communication channels; and
      causing the voice bot to utilize one or more of the parameters modified based on the representative input in generating an outgoing electronic communication that is responsive to the incoming electronic communication.

3. The method of claim 1, wherein determining whether the representative that provided the representative input is authorized to cause one or more of the parameters that the voice bot utilizes in communicating with the plurality of users on behalf of the entity to be modified comprises:
   processing, using a speaker identification (SID) model, audio data that captures the spoken input to determine whether the audio data is sufficient to authorize the representative that provided the spoken input.

4. The method of claim 3, wherein processing, using the SID model, the audio data that captures the spoken input to determine whether the audio data is sufficient to authorize the representative that provided the spoken input comprises:
processing, using a text dependent (TD) SID model as the SID model, the audio data to generate a TD speaker embedding, and
wherein determining whether the audio data is sufficient to authorize the representative that provided the spoken input comprises:
comparing, in a TD SID embedding space, the TD speaker embedding to one or more stored TD speaker embeddings; and
determining, based on comparing the TD speaker embedding to the one or more stored TD speaker embeddings, whether the audio data is sufficient to authorize the representative that provided the spoken input.

5. The method of claim 4, wherein processing, using the SID model, the audio data that captures the spoken input to determine whether the audio data is sufficient to authorize the representative that provided the spoken input further comprises:
in response to determining that the spoken input is a sufficient length to perform text independent (TI) SID:
processing, using a TI SID model as the SID model, the audio data to generate a TI speaker embedding, and
wherein determining whether the audio data is sufficient to authorize the representative that provided the spoken input comprises:
comparing, in a TI SID embedding space, the TI speaker embedding to one or more stored TI speaker embeddings; and
determining, based on comparing the TI speaker embedding to the one or more stored TI speaker embeddings, whether the audio data is sufficient to authorize the representative that provided the spoken input.

6. The method of claim 1, wherein determining whether the representative that provided the representative input is authorized to cause one or more of the parameters that the voice bot utilizes in communicating with the plurality of users on behalf of the entity to be modified comprises:
processing, using a word detection model, audio data that captures the spoken input to determine whether the spoken input includes a particular word or phrase that authorizes the representative that provided the representative input.

7. The method of claim 1, wherein determining whether the representative that provided the representative input is authorized to cause one or more of the parameters that the voice bot utilizes in communicating with the plurality of users on behalf of the entity to be modified comprises:
determining whether a device identifier of a client device utilized by the representative to provide the representative input is authorized device identifier for causing one or more of the parameters that the voice bot utilizes in communicating with the plurality of users on behalf of the entity to be modified.

8. The method of claim 1, wherein determining whether the representative that provided the representative input is authorized to cause one or more of the parameters that the voice bot utilizes in communicating with the plurality of users on behalf of the entity to be modified comprises:
processing, using a face identification model, vision data that captures the representative that provided the representative input to determine whether the vision data is sufficient to authorize the representative that provided the representative input,
wherein determining whether the vision data is sufficient to authorize the representative that provided the representative input comprises:
processing, using the face identification model, the vision data to generate a face embedding;
comparing, in a face embedding space, the face embedding to one or more stored face embeddings; and
determining, based on comparing the face embedding to the one or more stored face embeddings, whether the vision data is sufficient to authorize the representative that provided the representative input.

9. The method of claim 1, wherein determining whether the representative that provided the representative input is authorized to cause one or more of the parameters that the voice bot utilizes in communicating with the plurality of users on behalf of the entity to be modified comprises:
determining whether a location of a client device utilized by the representative to provide the representative input is authorized location for causing one or more of the parameters that the voice bot utilizes in communicating with the plurality of users on behalf of the entity to be modified.

10. The method of claim 1, wherein the representative input to modify one or more of the parameters that the voice bot utilizes in communicating with the plurality of users on behalf of the entity further includes a temporal indicator, and wherein the temporal indicator indicates a duration of time that the voice bot should utilize one or more of the parameters that were modified in communicating with the plurality of users on behalf of the entity.

11. The method of claim 1, further comprising:
in response to causing one or more of the parameters that the voice bot utilizes in communicating with the plurality of users on behalf of the entity to be modified based on the representative input:
causing one or more publicly accessible external databases to be updated, the one or more publicly accessible external databases being accessible to the plurality of users.

12. The method of claim 11, further comprising:
subsequent to causing one or more publicly accessible external databases to be updated, the one or more publicly accessible external databases being accessible to the plurality of users:
receiving, from a given user of the plurality of users, a query that is related to the entity; and
in response to receiving the query that is related to the entity:
executing the query over one or more of the publicly accessible external databases;
obtaining responsive content that is responsive to the query, the responsive content including at least some content that is based on one or more of the parameters; and
causing the responsive content to be provided for presentation to the given user.

13. The method of claim 1, wherein causing one or more of the parameters that the voice bot utilizes in communicating with the plurality of users on behalf of the entity to be modified based on the representative input comprises:
identifying one or more of the parameters in a database that is accessible to the voice bot; and causing one or more of the parameters in the database to be modified based on the representative input.

14. A method implemented by one or more processors, the method comprising:

receiving, from a representative associated with an entity, representative input directed to a voice bot associated with the entity via a telephone communication channel, from among one or more communication channels for communicating with the voice bot, the representative input being natural language input that includes one or more spoken terms captured via one or more microphones of a client device of the representative, the voice bot being previously trained to communicate with a plurality of users on behalf of the entity via one or more of the communication channels and the representative input being received subsequent to the voice bot being previously trained to communicate with the plurality of users on behalf of the entity;

processing the representative input, that is received via the telephone communication channel, to generate responsive content that is responsive to one or more of the spoken terms of the representative input;

causing the responsive content to be provided for audible presentation to the representative associated with the entity via one or more speakers of the client device of the representative;

receiving, from the representative, an additional representative input directed to the voice bot associated with the entity via the telephone communication channel, the additional representative input being additional natural language input that includes one or more additional spoken terms captured via the one or more microphones of the client device of the representative, and the additional representative input being received subsequent to the representative input that is received subsequent to the voice bot being previously trained to communicate with the plurality of users on behalf of the entity; and in response to determining that one or more of the additional spoken terms include a correction to the responsive content:

causing one or more parameters that the voice bot utilizes in communicating with the plurality of users on behalf of the entity to be modified based on one or more of the additional spoken terms of the additional representative input.

15. A system comprising:
at least one processor; and
memory storing instructions that, when executed, cause the at least one processor to:

identify a voice bot associated with an entity, the voice bot being previously trained to communicate with a plurality of users on behalf of the entity via one or more communication channels for communicating with the voice bot;

subsequent to the voice bot being previously trained to communicate with the plurality of users on behalf of the entity:

receive, from a representative associated with the entity, representative input to modify one or more parameters that the voice bot utilizes in communicating with the plurality of users on behalf of the entity, the representative input being received via a telephone communication channel, from among the one or more communication channels, that the plurality of users utilize to communicate with the entity, and the representative input being natural language input that is spoken by representative associated with the entity and via the telephone communication channel;

in response to receiving the representative input to modify one or more of the parameters that the voice bot that was previously trained to communicate with the plurality of users on behalf of the entity:

determine whether the representative associated with the entity that provided the representative input is authorized on behalf of the entity, to cause one or more of the parameters that the voice bot utilizes in communicating with the plurality of users on behalf of the entity to be modified; and in response to determining that the representative associated with the entity that provided the representative input is authorized, on behalf of the entity, to cause one or more of the parameters that the voice bot utilizes in communicating with the plurality of users on behalf of the entity to be modified:

cause one or more of the parameters that the voice bot utilizes in communicating with the plurality of users on behalf of the entity to be modified based on the representative input.

* * * * *